United States Patent [19]

Kyohzuka et al.

[11] Patent Number: 5,012,695
[45] Date of Patent: May 7, 1991

[54] GEAR-SHIFTING SHOCK SUPPRESSING SYSTEM FOR AUTOMATIC TRANSMISSION VEHICLE

[75] Inventors: Takahiro Kyohzuka; Masaki Fujii; Toshiyuki Kikuchi; Mitsutoshi Abe; Yuji Matsuno, all of Hiroshima, Japan

[73] Assignee: Mazda Motor Corporation, Hiroshima, Japan

[21] Appl. No.: 417,015

[22] Filed: Oct. 4, 1989

[30] Foreign Application Priority Data

Oct. 17, 1988 [JP] Japan .................................. 63-253068
Feb. 17, 1989 [JP] Japan .................................... 1-39129

[51] Int. Cl.⁵ .............................................. B60K 41/18
[52] U.S. Cl. ....................................... 74/859; 74/851
[58] Field of Search .................. 74/851, 855, 858, 859

[56] References Cited

U.S. PATENT DOCUMENTS

| 3,545,307 | 12/1970 | Bildat | 74/855 X |
| 4,226,141 | 10/1980 | Espenschied | 74/859 X |
| 4,370,903 | 2/1983 | Stroh et al. | 74/851 X |
| 4,403,527 | 9/1983 | Mohl et al. | 74/851 |
| 4,724,723 | 2/1988 | Lockhart et al. | 74/851 X |
| 4,800,781 | 1/1989 | Yasue et al. | 74/851 X |
| 4,889,014 | 12/1989 | Iwata | 74/859 X |

FOREIGN PATENT DOCUMENTS 60-175855 10/1985 Japan .
63-14171 3/1988 Japan .

Primary Examiner—Dirk Wright
Attorney, Agent, or Firm—Sixbey, Friedman, Leedom & Ferguson

[57] ABSTRACT

A gear-shifting shock suppressing system for a vehicle provided with an automatic transmission which shifted to a desired gear-speed on the basis of a gear-shifting signal controls the output of the engine of the vehicle in order to suppress gear-shifting shock which occurs when the automatic transmission shifts. The gear-shifting shock suppressing system detects the interval between successive two gear-shifting signals and controls the output of the engine when the interval between successive two gear-shifting signals is longer than the predetermined time in a manner different from the manner in which the gear-shifting shock suppressing system controls the output of the engine when the interval between successive two gear-shifting signals is shorter than the predetermined time.

12 Claims, 18 Drawing Sheets

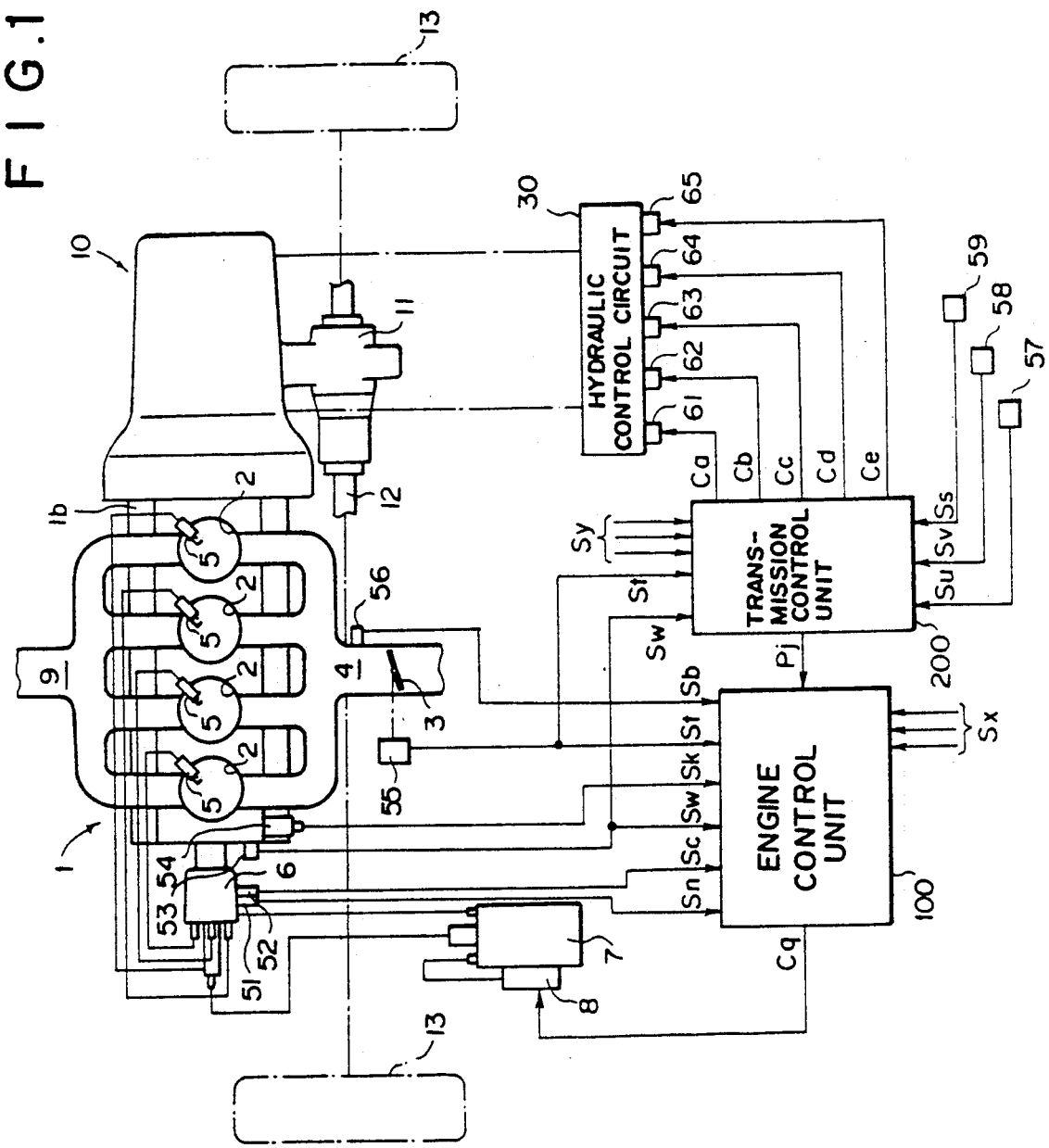

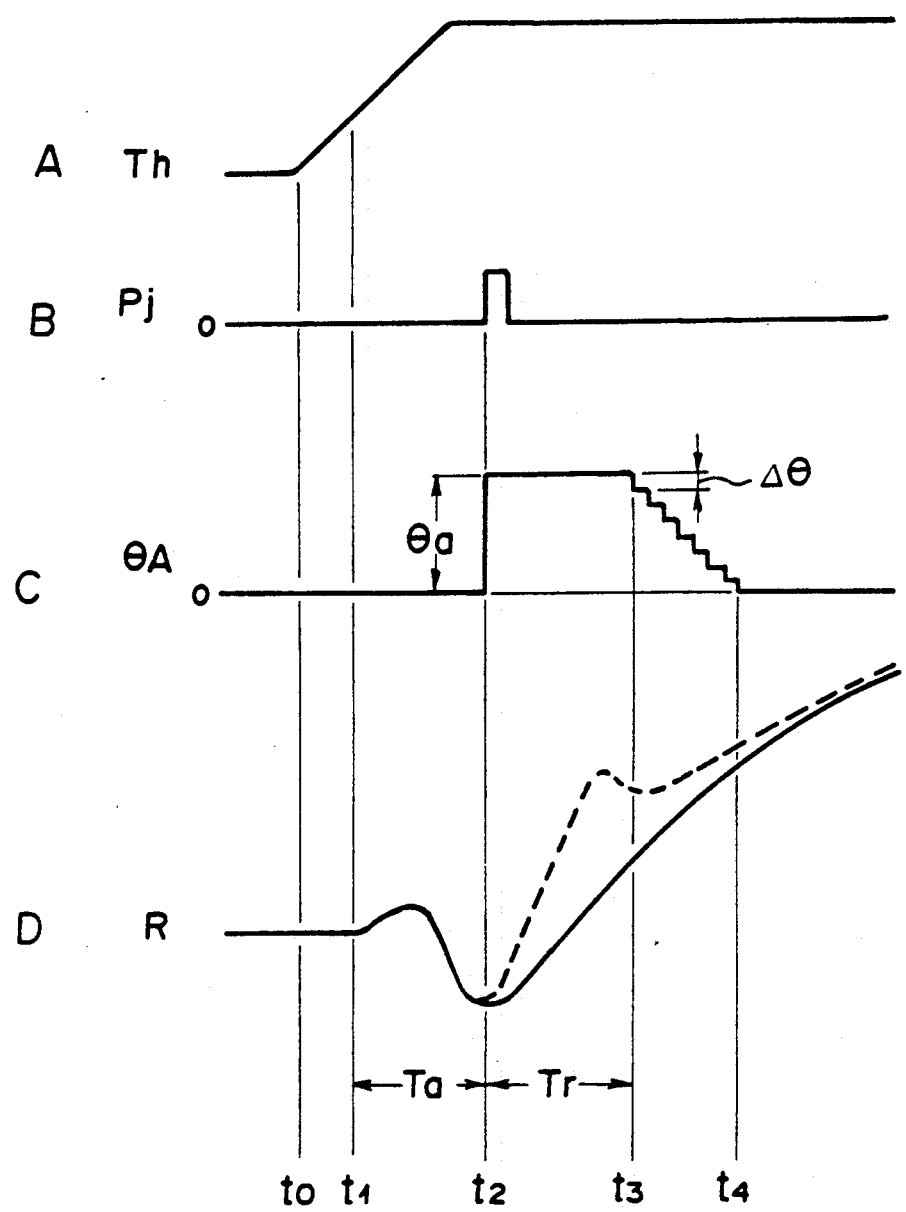

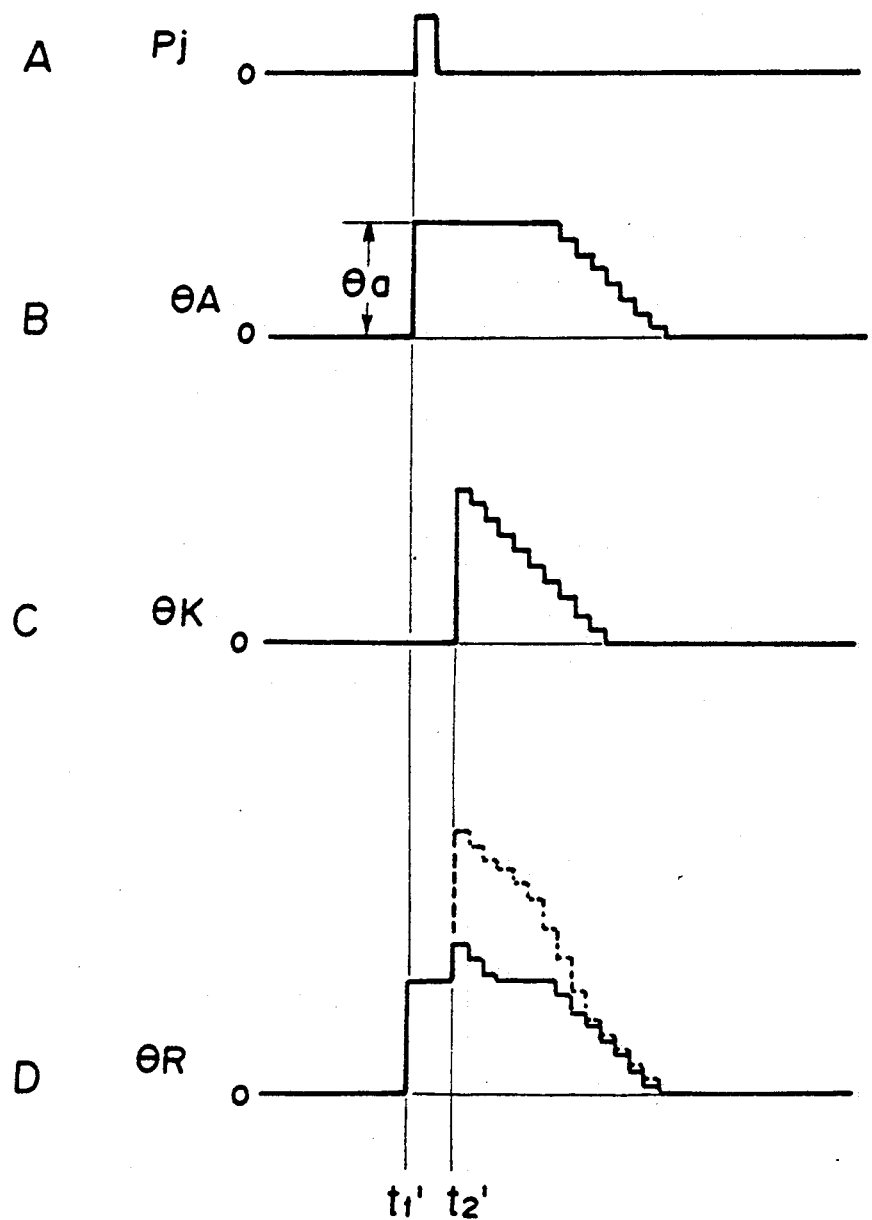

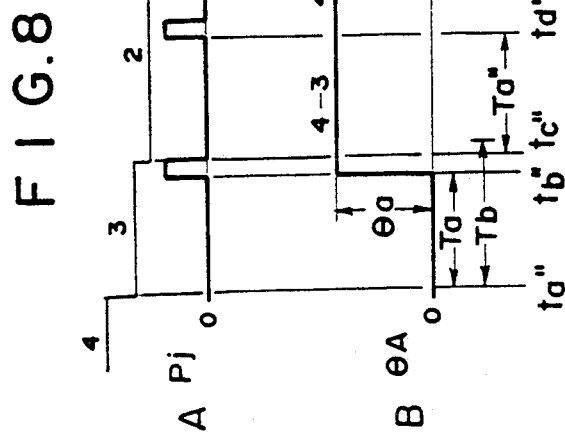
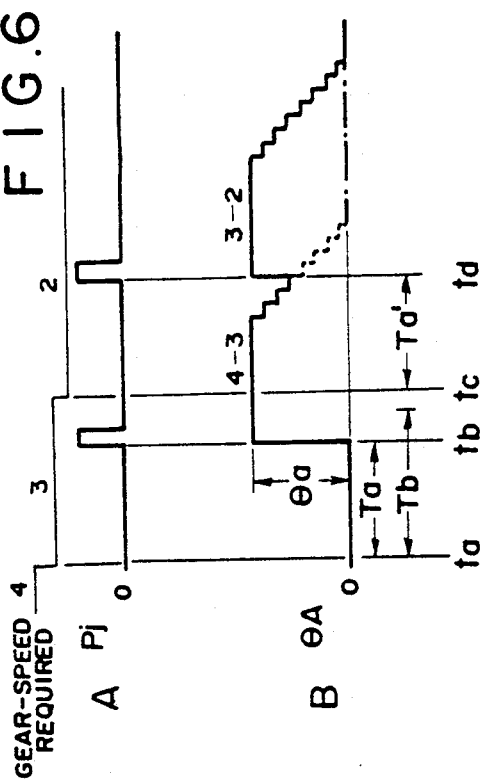
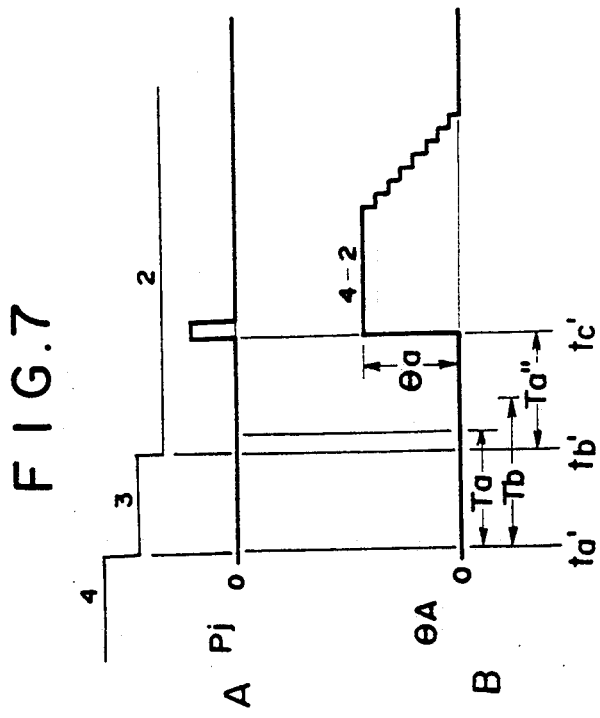

GEAR-SHIFTING SHOCK SUPPRESSING SYSTEM FOR AUTOMATIC TRANSMISSION VEHICLE

BACKGROUND OF THE INVENTION

1. Field of the Invention

This invention relates to a gear-shifting shock suppressing system for an automatic transmission vehicle.

2. Description of the Prior Art

The automatic transmission for a vehicle typically comprises a torque convertor having a pump impeller, a turbine runner and a stator, a transmission gear mechanism which is connected to the turbine runner of the torque convertor and has a plurality of friction coupling members such as clutches and brakes, and a hydraulic control system having a hydraulic control circuit which controls the condition of application (applied or released) of the friction coupling members under the control of a control means, thereby changing the power transmission path of the transmission gear mechanism so that the transmission gear mechanism shifts to a desired gear-speed according to the running condition of the vehicle.

During the gear-shifting operation, the engine speed changes with change in the gear ratio to cause fluctuation in the transmission output torque whereas the vehicle speed does not substantially change due to the inertia of the vehicle body. The fluctuation in the transmission output torque changes the acceleration of the vehicle body and causes a so-called gear-shifting shock. The gear-shifting shock may be suppressed when the hydraulic pressure applied to the friction coupling members is controlled so that they are smoothly applied or released, but this approach is disadvantageous in that the friction coupling members are kept slipping for a long time, which causes seizing in the friction coupling members and increases wear of them.

Thus it has been proposed to retard the ignition timing so that the engine output is temporarily lowered and the gear-shifting shock is suppressed. See Japanese Unexamined Patent Publication No. 62(1987)-131831, for instance.

However since there is a certain time lag between the time the hydraulic control system outputs a gear-shifting signal and the time the transmission gear mechanism actually shifts to the gear-speed designated by the signal and the gear-shifting shock occurs, the ignition timing must be retarded in time to the occurrence of the gear-shifting shock. Otherwise, the gear-shifting shock can be enhanced or the acceleration performance is adversely affected. The gear-shifting shock suppressing system disclosed in Japanese Unexamined Patent Publication No. 60(1985)-175855, the ignition timing is controlled so that the engine output is lowered a predetermined time after the hydraulic control system outputs the gear-shifting signal. Further, the degree of gear-shifting shock depends upon the kind of gear-shifting (upshift or downshift?), and upon the gear-speeds before and after the gear-shifting, and in order to effectively suppress the gear-shifting shock without adversely affecting the acceleration performance or the like, the ignition timing should be controlled taking into account the degree of gear-shifting. The gear-shifting shock suppressing system disclosed in Japanese Patent Publication No. 63(1988)-14171, the engine output is lowered a predetermined time after the hydraulic control system outputs an upshift signal for a predetermined time which is determined according to the kind of the upshift signal.

However, there has been a problem that the gear-shifting shock cannot be satisfactorily suppressed when the gear-shifting is repeatedly effected in a short time. For example, if a 3-2 downshift signal is generated a relatively long time after generation of a 4-3 downshift signal, the transmission gear mechanism is once shifted to third and thereafter to second. Accordingly, the gear-shifting shock occurs twice. However if the time between the generation of the 4-3 downshift signal and the generation of the 3-2 is extremely short, the transmission gear mechanism is substantially directly shifted to second and the gear-shifting shock is substantially equivalent to the gear-shifting shock accompanying the 4-2 downshift. That is, the time the gear-shifting shock occurs and the degree of the gear-shifting shock are largely affected by the interval between the gear-shifting signals. Accordingly, if the engine output is controlled simply based on the 4-3 downshift signal or the 3-2 downshift signal, satisfactory shock suppressing effect cannot be expected.

SUMMARY OF THE INVENTION

In view of the foregoing observations and description, the primary object of the present invention is to provide a gear-shifting shock suppressing system which can satisfactorily suppress the gear-shifting shock even if the gear-shifting signals are generated in quick succession.

In accordance with the present invention, there is provided a gear-shifting shock suppressing system for a vehicle provided with an automatic transmission which shifts to a desired gear-speed on the basis of a gear-shifting signal, said gear-shifting shock suppressing system being for controlling the output of the engine of the vehicle in order to suppress gear-shifting shock which occurs when the automatic transmission shifts and characterized by having a determining means which detects the interval between successive two gear-shifting signals and determines whether the interval therebetween is longer or shorter than a predetermined time, and a control changing means which causes the gear-shifting shock suppressing system to control the output of the engine when the interval between successive two gear-shifting signals is longer than the predetermined time in a manner different from the manner in which the gear-shifting shock suppressing system controls the output of the engine when the interval between successive two gear-shifting signals is shorter than the predetermined time.

BRIEF DESCRIPTION OF THE DRAWINGS

FIG. 4 shows a time chart of the gear-shifting control and the ignition timing control, FIG. 5 shows a time chart of the ignition timing control in the case where the knock-related correction is made, FIGS. 6 to 8 show time charts of the ignition timing control in the case where the 3-2 downshifting condition has been satisfied after the 4-3 downshift signal was output.

DESCRIPTION OF THE PREFERRED EMBODIMENTS

Figure 10A:
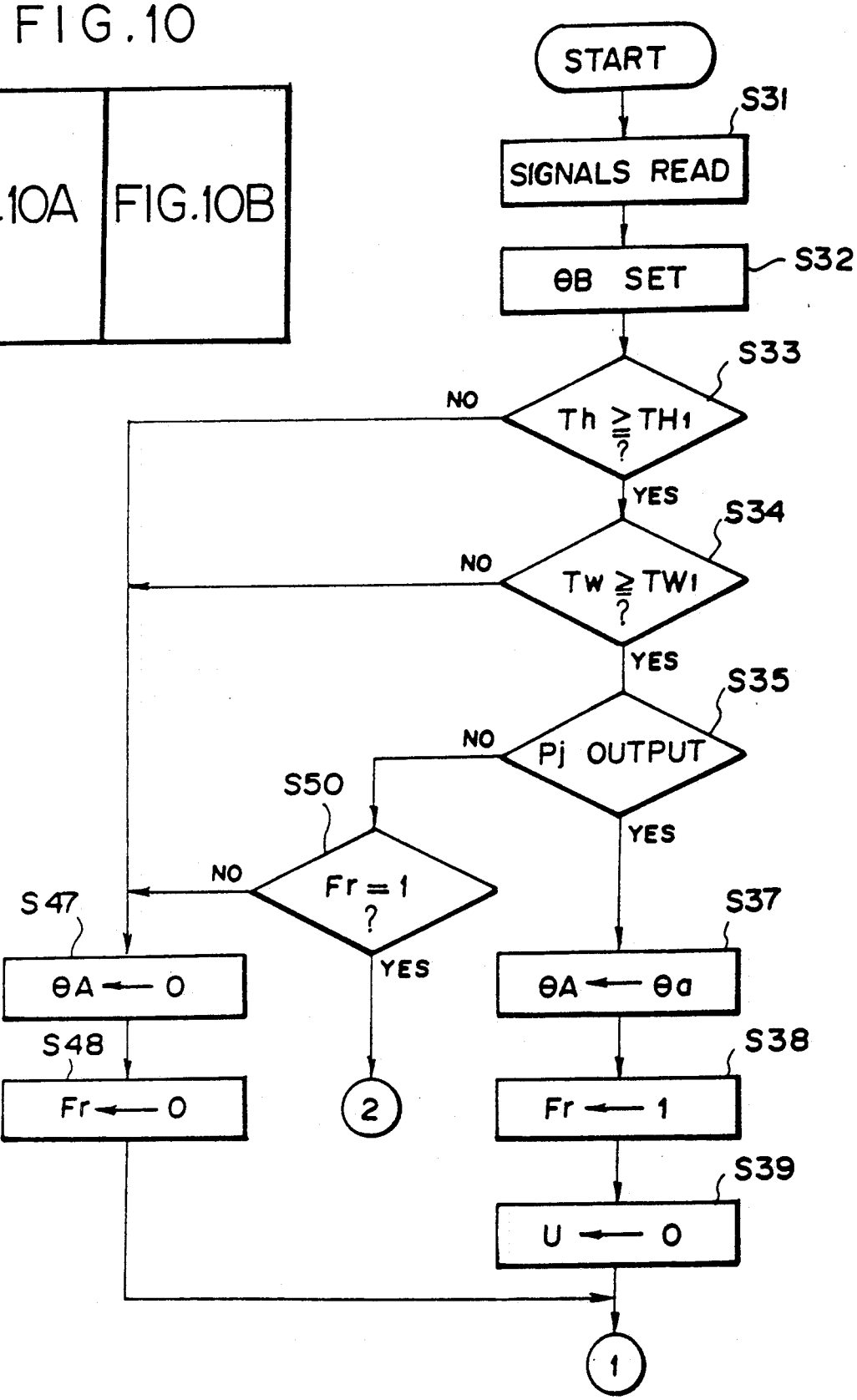
Figures 1, 10B:
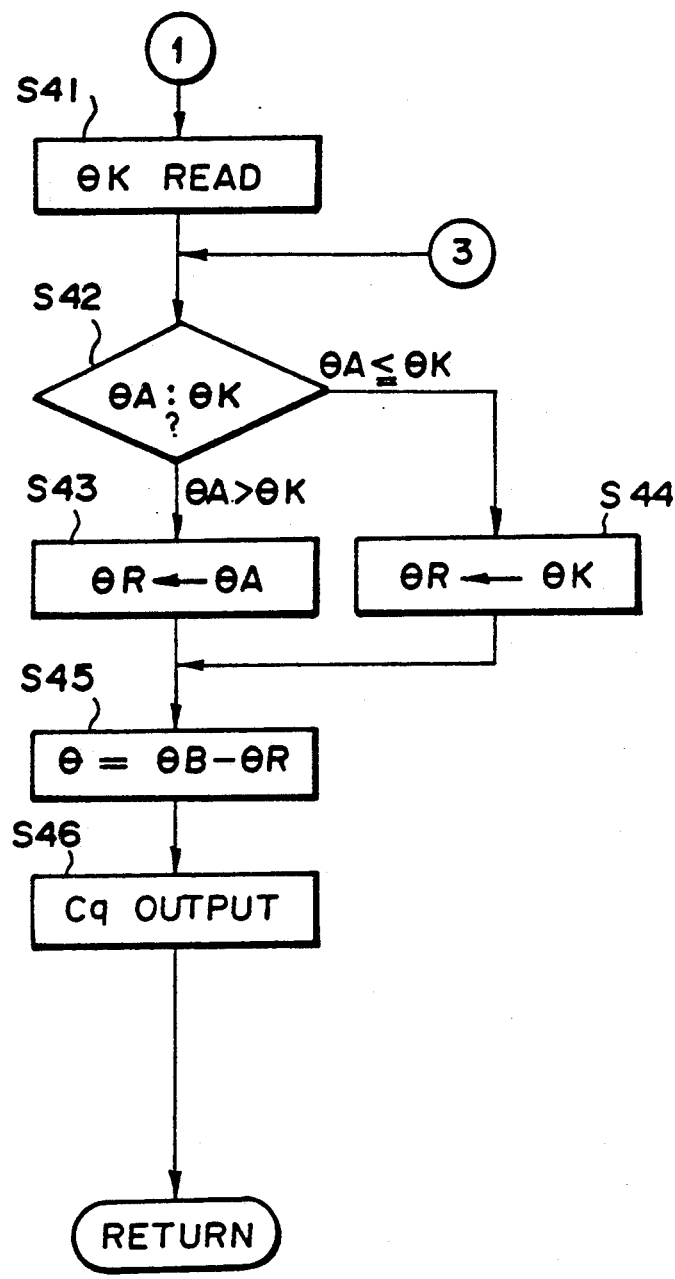
FIG. 1 is a schematic view showing a gear-shifting shock suppressing system in accordance with an embodiment of the present invention.

In FIG. 1, a four-cylinder engine 1 has four cylinders 2 which are communicated with the atmosphere by way of an intake passage 4. A throttle valve 3 is provided in the intake passage 4. Reference numerals 5 to 9 respectively denote a spark plug, a distributor, an ignition coil, an ignition controller and an exhaust passage. The engine 1 has a crankshaft 1a, and the revolution of the crankshaft 1a is transmitted to the front wheels (driving wheels) 13 by way of an automatic transmission 10, a differential 11 and an axle 12.

Figure 2:
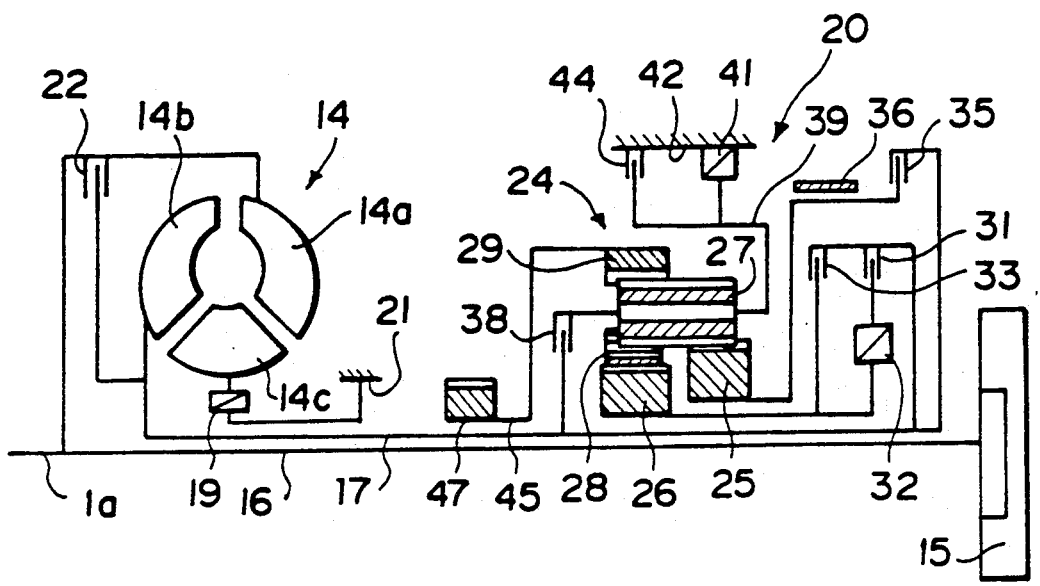
FIG. 2 is a schematic view showing the mechanism of an automatic transmission.

As shown in FIG. 2, the automatic transmission 10 comprises a torque convertor 14, a transmission gear mechanism 20 and a hydraulic control system formed of a hydraulic control circuit 30 and a transmission control unit 200 (FIG. 1).

The torque convertor 14 comprises a pump impeller 14a, a turbine runner 14b, a stator 14c and a casing 21. The pump impeller 14a is connected to the crankshaft 1a and an oil pump 15 is connected to the crankshaft 1a by way of a pump driving shaft 16. The turbine runner 14b is connected to the transmission gear mechanism 20 by way of a hollow turbine shaft 17 and to the crankshaft 1a by way of a lockup clutch 22. A one-way clutch 19 is provided between the stator 14c and the casing 21 so that the stator 14c is rotated in the same direction as the pump impeller 14a and the turbine runner 14b.

The transmission gear mechanism 20 has four forward speeds and one reverse speed, and is provided with a planetary gear unit 24. The planetary gear unit 24 has a small sun gear 25, a large sun gear 26, a long pinion gear 27, short pinion gears 28 and a ring gear 29. A forward clutch 31 and a coasting clutch 33 are connected in parallel between the small sun gear 25 and the turbine shaft 17. A one-way clutch 32 is inserted between the small sun gear 25 and the forward clutch 31. A reverse clutch 35 is connected between the large sun gear 26 and the turbine shaft 17, and a 3-4 clutch 38 is connected between the long pinion gear 27 and the turbine shaft 17. The long pinion gear 27 is connected to a carrier 39 and a one-way clutch 41 and a low and reverse brake 44 is connected in parallel between the carrier 39 and a transmission casing 42. The ring gear 29 is connected to an output gear 47 by way of an output shaft 45, and the torque on the output shaft 45 is transmitted to the differential 11.

The hydraulic control system shifts the transmission gear mechanism 20 to a desired gear-speed by selectively applying and releasing the forward clutch 31, the coasting clutch 33, the reverse clutch 35, the 2-4 brake 36, the 3-4 clutch 38 and the low and reverse brake 44. The relation between the condition of application of the clutches, the brakes and the one-way clutches 32 and 41, and the gear-speed is shown in table 1.

Table 1

| range | speed | clutch 31 33 38 35 | brake 36 44 | one-way clutch 32 41 |
|---|---|---|---|---|
| P R N | - - - | ○ | ○ | |
| D | 1 | ○ | | ○ ○ |
|   | 2 | ○ | ○ | ○ |
|   | 3 | ○ ○ ○ | | ○ |
|   | 4 | ○   ○ | ○ | (○) |
| 2 | 1 | ○ | | ○ ○ |
|   | 2 | ○ ○ | ○ | ○ |
|   | 3 | ○ ○ ○ | | ○ |
| 1 | 1 | ○ ○ | ○ | ○ |
|   | 2 | ○ ○ | ○ | ○ |

○—applied. (○)—applied though not contribute to power transmission.

The hydraulic control circuit 30 actuates these friction coupling members under the control of the transmission control unit 200.

An engine control unit 100 controls the engine 1. An engine speed signal Sn and a crank angle signal Sc are input into the engine control unit 100 from an engine speed sensor 51 and a crank angle sensor 52 provided on the distributor 6. A coolant temperature signal Sw representing the temperature Tw of engine cooling water and a knocking signal Sk representing the intensity of knock are input into the engine control unit 100 from the coolant temperature sensor 53 and knock sensor 54 provided on the engine block 1b. Further, a throttle opening signal St representing the opening of a throttle valve 3 and an intake vacuum signal Sb are input into the engine control unit 100 from a throttle opening sensor 55 and an intake vacuum sensor 56. Further other various signals Sx necessary for controlling the engine 1 are input into the engine control unit 100.

The engine control unit 100 determines an effective spark advance angle $\theta$ on the basis of the aforesaid signals and a transmission-related spark retardation pulse signal Pj which is input into the engine control unit 100 from the transmission control unit 200. The effective spark advance angle $\theta$ is for determining the ignition timing and the engine control unit 100 generates an ignition timing control signal Cq on the basis of the effective spark advance angle $\theta$ and inputs it into the ignition controller 8. The ignition controller 8 causes the ignition coil 7 to produce a high-voltage surge in the secondary winding of the ignition coil 7 at the timing represented by the ignition timing control signal Cq. The high-voltage surge is sent to the spark plug 5 by way of the distributor 6.

The coolant temperature signal Sw and the throttle opening signal St are also input into the transmission control unit 200. Further, A turbine speed signal Su, a vehicle speed signal Sv and a range signal Ss are input into the transmission control unit 200 respectively from a turbine speed sensor 57, a vehicle speed sensor 58 and a shift position sensor 59. Further other various signals Sy necessary for controlling the transmission 10 are input into the transmission control unit 200. Solnoid valves 61 to 65 (FIG. 1) respectively controls the hydraulic pressures applied to the clutches 31, 33, 38 and 35, the brakes 36 and 44 and the lockup clutch 22. The structure and the operation of these solenoid valves 61 to 65 are well known and will not be described here. The transmission control unit 200 produces driving pulse signals (gear-shifting signals) Ca, Cb, Cc and Cd on the basis of the aforesaid signals input thereinto and inputs them respectively to the solenoid valves 61 to 64, thereby applying or releasing the clutches and brakes according to a desired range and gear-speed and shifting the transmission gear mechanism 20 to the desired range and gear-speed. Further, the transmission control unit 200 produces a driving pulse signal Ce on the basis of the aforesaid signals input thereinto and selectively inputs into the solenoid valve 65, thereby selectively applying or releasing the lockup clutch 22 and effecting the lockup control.

The transmission control unit 200 determines whether the upshifting condition or the downshifting condition has been met according to the throttle opening Th represented by the throttle opening signal St and the vehicle speed V represented by the vehicle speed signal Sv referring to gear-shifting lines a to f in a shift pattern map (shown in FIG. 3) which has been stored in the transmission control unit 200.

When the transmission gear mechanism 20 is shifted down, the torque on the output shaft 45 of the transmission gear mechanism 20 fluctuates due to the change in the engine speed caused by the change in the gear ratio and the gear-shifting shock occurs. In order to lower the engine output to suppress the gear-shifting shock, the ignition timing is retarded according to the kind of downshift.

There is a certain time lag between the time the transmission control unit 200 outputs a gear-shifting signal and the time the transmission gear mechanism 20 actually shifts to the gear-speed designated by the signal and the gear-shifting shock occurs. The time lag is due to the delay in feeding the hydraulic pressure to the friction coupling members and varies according to the kind of the gear-shifting. Taking into account this fact, the transmission control unit 200 outputs the transmission-related spark retardation pulse signal Pj to the engine control unit 100 a predetermined time Ta after the gear-shifting signal is output, the predetermined time Ta being determined according to the kind of the downshift.

When a 4-3 downshift signal is output, for instance, the transmission control unit 200 begins to increment a count CC for determination of the kind of the gear-shifting, and when another downshift signal, i.e., a 3-2 downshift signal or a 3-1 downshift signal, is output before the count CC reaches a value B corresponding to a preset time interval Tb (e.g., 100 msec), the downshift to be effected at that time is considered to be a jump downshift. That is, it is considered that the transmission gear mechanism 20 is directly shifted down from fourth to second or first without being actually shifted to third. In this case, the downshift is determined to be 4-2 downshift or 4-3 downshift. The predetermined time Ta is set to correspond to the 4-2 downshift or the 4-1 downshift. On the other hand, when said another downshift signal, the 3-2 downshift signal or the 3-1 downshift signal, is output after the count CC exceeds the value B, it is determined that the 4-3 downshift has been completed and the downshift to be effected at that time is considered to be the 3-2 downshift or the 3-1 downshift. The predetermined time Ta is set to correspond to the 3-2 downshift or the 3-1 downshift.

The engine control unit 100 determines a basic spark advance angle $\theta B$ on the basis of the engine speed and the intake vacuum, and sets a transmission-related correction value $\theta A$ when it receives the transmission-related spark retardation pulse signal Pj from the transmission control unit 200. The transmission-related correction value $\theta A$ is for retarding the ignition timing from a basic ignition timing corresponding to the basic spark advance angle $\theta B$, thereby suppressing the gear-shifting shock accompanying the gear-shifting. Further, when the knock intensity represented by the signal Sk exceeds a predetermined value, the engine control unit 100 sets a knock-related correction value $\theta K$ which is for retarding the ignition timing from a basic ignition timing corresponding to the basic spark advance angle $\theta B$, thereby suppressing the knock.

FIG. 4 shows a time chart of the gear-shifting control and the ignition timing control. When the downshifting condition (e.g., the 4-3 downshifting condition) is satisfied at time $t_1$ while the accelerator pedal begins to be depressed at time $t_0$ and the throttle opening Th is increased as shown by line A in FIG. 4, the transmission control unit 200 outputs the transmission-related spark retardation pulse signal Pj to the engine control unit 100 at time $t_2$ which is the predetermined time Ta after the time $t_1$. Then the engine control unit 100 sets the transmission-related correction value $\theta A$ to an initial value $\theta a$ as shown by line C. The transmission-related correction value $\theta A$ is kept at the initial value $\theta a$ until time $t_3$ which is a predetermined time Tr after the time $t_2$, the predetermined time Tr corresponding to the period for which the related friction coupling members of the transmission gear mechanism 20 are kept half-applied. The transmission-related correction value $\theta A$ is reduced stepwise $\Delta \theta$ by $\Delta \theta$ after the time $t_3$ until time $t_4$ at which it is nullified. Thus the basic spark advance angle $\theta B$ is corrected with the transmission-related correction value $\theta A$ and then the effective spark advance angle $\theta$ is set on the basis of the corrected basic spark advance angle $\theta B$. The ignition timing is controlled on the basis of the effective spark advance angle $\theta$ thus obtained.

The torque R on the output shaft 45 is slightly increased immediately after the time $t_1$, then reduced and then gradually increased after the time $t_2$ as shown by the solid line D in FIG. 4. Thus, the rate of increase in the torque R after the time $t_2$ is reduced and the gear-shifting shock is suppressed. If the ignition timing is not retarded, the torque R will be abruptly increased after the time $t_2$ as shown by the broken line and the gear-shifting shock will occur.

FIG. 5 shows a time chart of the ignition timing control in the case where the knock-related correction is made. When the downshifting condition has been satisfied and the transmission-related spark retardation pulse signal Pj is output at a time $t_1'$ as shown by line A in FIG. 5, the transmission-related correction value $\theta A$ is set to an initial value $\theta a$ as shown by line B and the transmission-related spark retardation control is started. When a knock stronger than a predetermined value occurs at time $t_2'$ immediately after the transmission-related spark retardation control is started, a knock-related correction value $\theta k$ is set according to the intensity of the knock after the time $t_2'$ as shown by line C. However, in such a case, the final correction value $\theta R$ is determined in the following manner. That is, as shown by line D, the final correction value $\theta R$ is set to be equal to the transmission-related correction value $\theta A$ between the times $t_1'$ and $t_2'$ and to be equal to the larger one of the transmission-related correction value $\theta A$ and the knock-related correction value $\theta k$.

In this manner, the retardation angle is prevented from becoming excessively large as shown by the broken line and the output of the engine 1 is prevented from being excessively reduced even if both the transmission-related correction value $\theta A$ and the knock-related correction value $\theta k$ are set at the same time. Further, the final correction value $\theta R$ corresponds to both the transmission-related correction value $\theta A$ which is necessary to suppress the gear-shifting shock and the knock-related correction value $\theta k$ which is necessary to suppress the engine knock.

FIGS. 6 to 8 show time charts of the ignition timing control in the case where the 3-2 downshifting condition has been satisfied after the 4-3 downshift signal was output. In FIG. 6, when the 4-3 downshift signal is output at time $t_a$, the transmission-related spark retardation pulse signal Pj is output at $t_b$ the predetermined time Ta after the time $t_a$ as shown by line A and the transmission-related correction value $\theta A$ is set to the initial value $\theta a$ as shown by line B and the 4-3-downshift-related spark retardation control is started. When the 3-2 downshift signal is output at time $t_c$ the predetermined time Tb after the time $t_a$, it is considered that normal two gear-shiftings are effected, and the transmission-related spark retardation pulse signal Pj is output at time $t_d$ a predetermined Ta' after the time $t_c$, the predetermined Ta' being determined for the 3-2 downshift. Then the transmission-related correction value $\theta A$ is set to the initial value $\theta a$ (which may differ from the initial value $\theta a$ for the 4-3 downshift). Thus the 3-2-downshift-related spark retardation control is started.

On the other hand, as shown in FIG. 7, when the 4-3 downshift signal is output and then the 3-2 downshift signal is output at time $t_b'$ which is before an elapse of the predetermined time Ta and the predetermined time Tb after the time $t_a'$ at which the 4-3 downshift signal is output, it is considered that a jump gear-shifting (i.e., the 4-2 downshift) is to be effected, and the transmission-related spark retardation pulse signal Pj is output at time $t_c'$ a predetermined Ta'' after the time $t_b'$, the predetermined Ta'' being determined for the 4-2 downshift. Then the transmission-related correction value $\theta A$ is set to the initial value $\theta a$. Thus the 4-2-downshift-related spark retardation control is started.

As shown in FIG. 8, when the 4-3 downshift signal is output and then the 3-2 downshift signal is output at time $t_b''$ which is after an elapse of the predetermined time Ta and before an elapse of the predetermined time Tb, the transmission-related spark retardation pulse signal Pj is output at the time $t_b''$ and the transmission-related correction value $\theta A$ is set to the initial value $\theta a$. Thus the 4-3-downshift-related spark retardation control is started. At the time $t_c''$ which is the time the 3-2 downshift signal is output before an elapse of the predetermined time Tb, it is considered that a jump gear-shifting (i.e., the 4-2 downshift) is to be effected, and the transmission-related spark retardation pulse signal Pj is output at time $t_d''$ after an elapse of the predetermined time Ta'' for the 4-2 downshift. Then the transmission-related correction value $\theta A$ is set to the initial value $\theta a$. Thus the 4-2-downshift-related spark retardation control is started.

In the cases shown in FIGS. 6 and 8, when the 3-2 downshift signal is output at the time $t_c$ or $t_c''$, the current transmission-related correction value $\theta A$ may be corrected instead of setting to the initial value $\theta a$.

Said predetermined time Ta is determined according to the kind of the gear-shifting and the throttle opening as shown in the following table.

|  | T1 | T2 | T3 | T4 | T5 | T6 | T7 | T8 |
|---|---|---|---|---|---|---|---|---|
| 4→3 | Ta61 | Ta62 | Ta63 | Ta64 | Ta65 | Ta66 | Ta67 | Ta68 |
| 4→2 | Ta51 | Ta52 | Ta53 | Ta54 | Ta55 | Ta56 | Ta57 | Ta58 |
| 4→1 | Ta41 | Ta42 | Ta43 | Ta44 | Ta45 | Ta46 | Ta47 | Ta48 |
| 3→2 | Ta31 | Ta32 | Ta33 | Ta34 | Ta35 | Ta36 | Ta37 | Ta38 |
| 3→1 | Ta21 | Ta22 | Ta23 | Ta24 | Ta25 | Ta26 | Ta27 | Ta28 |
| 2→1 | Ta11 | Ta12 | Ta13 | Ta14 | Ta15 | Ta16 | Ta17 | Ta18 |

In the above table, Ta61 represents the value of Ta when the throttle opening is T1 ($\frac{1}{8}$ in this example) and the gear-shifting is 4-3 downshift, Ta51 represents the value of Ta when the throttle opening is T1 ($\frac{1}{8}$ in this example) and the gear-shifting is 4-2 downshift, and so on. Each value of the Ta experimentally obtained and stored in the form of a table like the above table.

Also the initial value $\theta a$ and the predetermined time Tr are determined according to the kind of the gear-shifting and the throttle opening. They are also experimentally obtained and stored in the form of a table like the above table.

The engine control unit 100 and the transmission control unit 200 are respectively formed of micro computers.

Figure 9A:
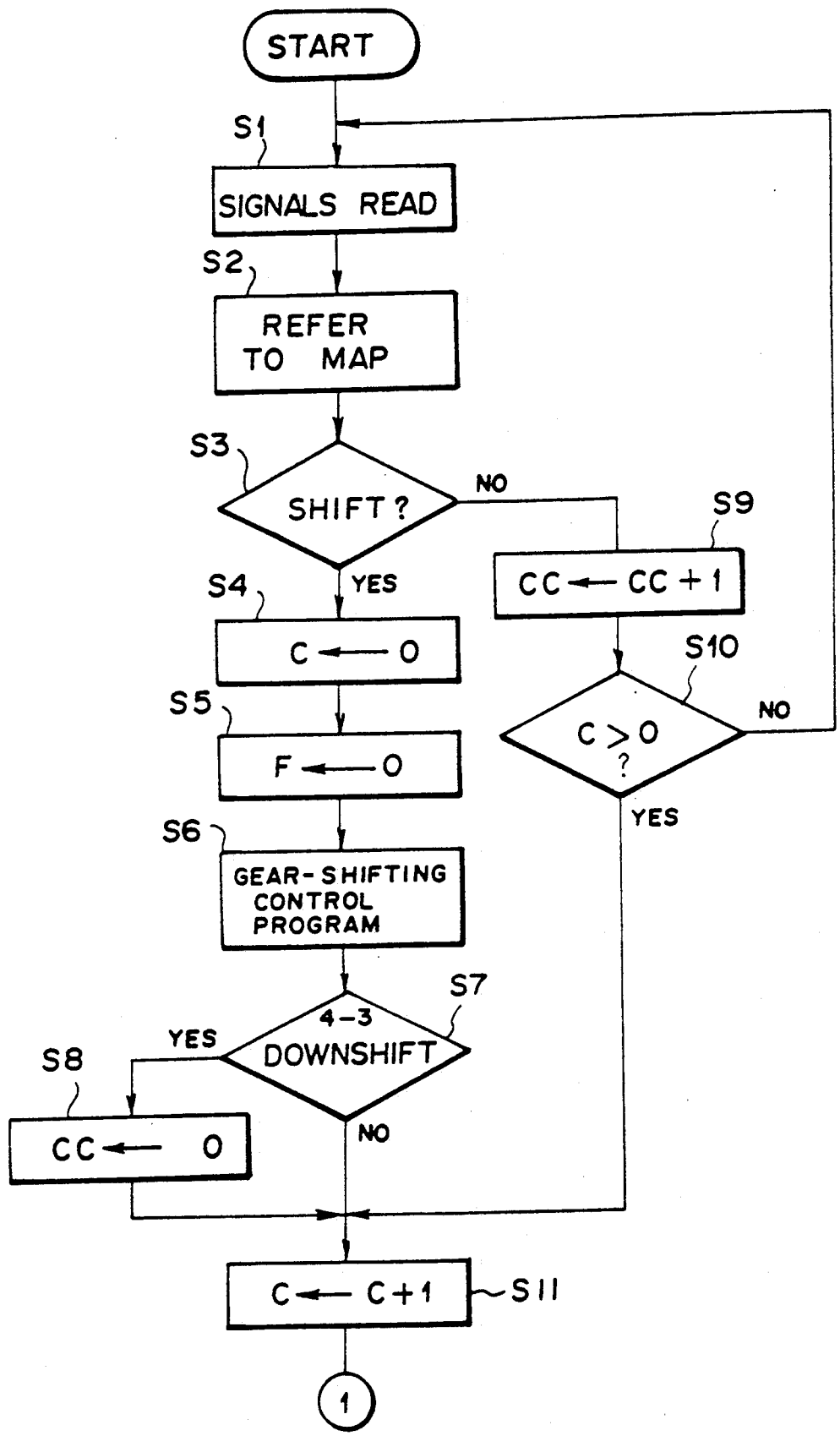
FIGS. 9 to 11 are flow charts for illustrating the operation of the transmission control unit and and the engine control unit.
Figure 9B:
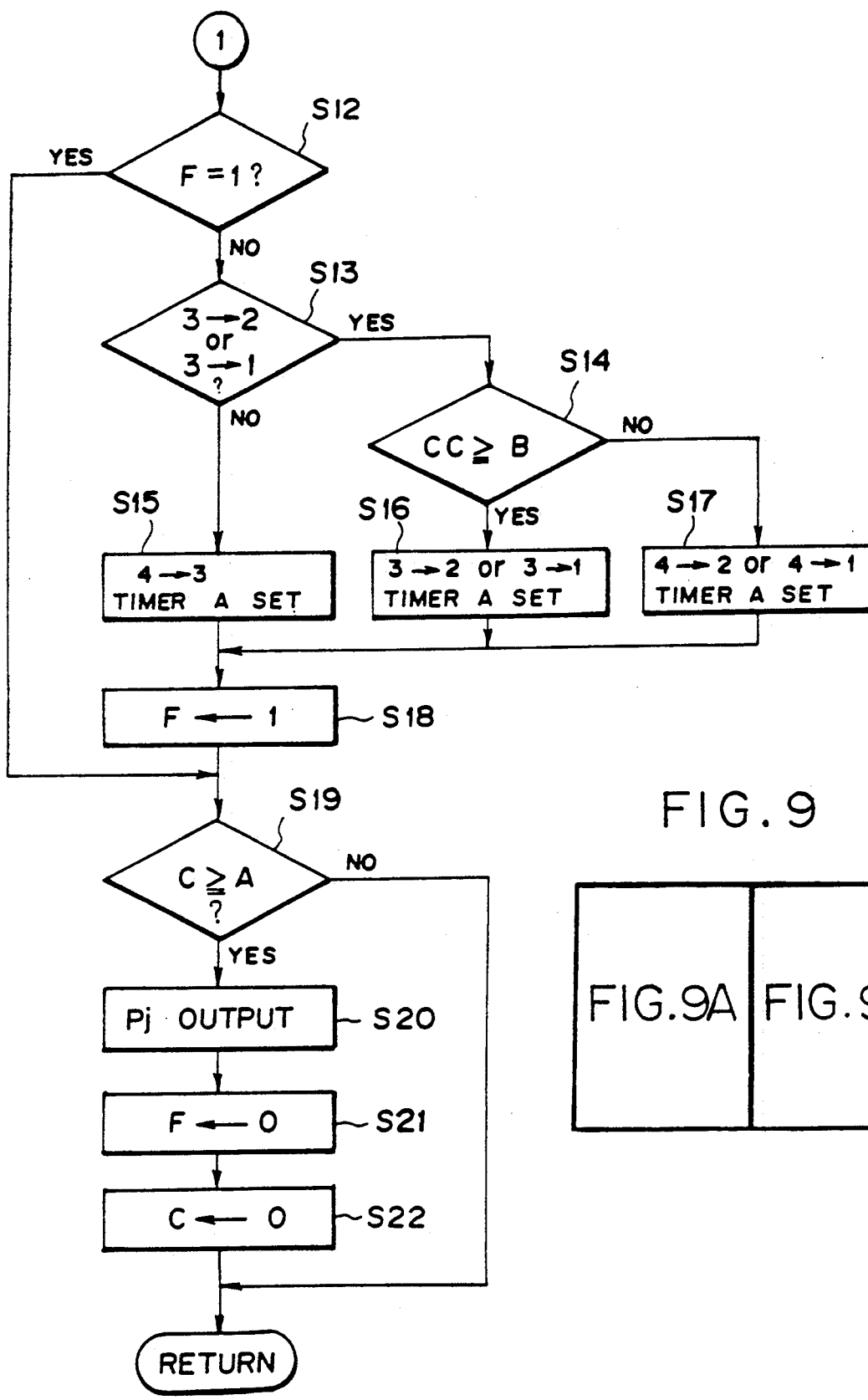
Figure 9:
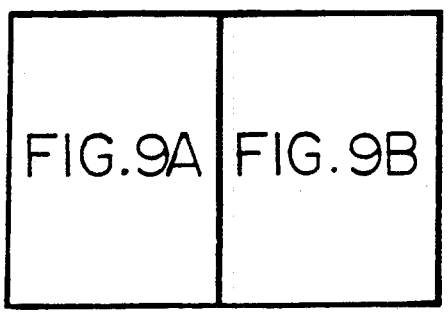

The flow chart shown in FIG. 9 is the program which the transmission control unit 200 performs for the gear-shifting control.

Figure 3:
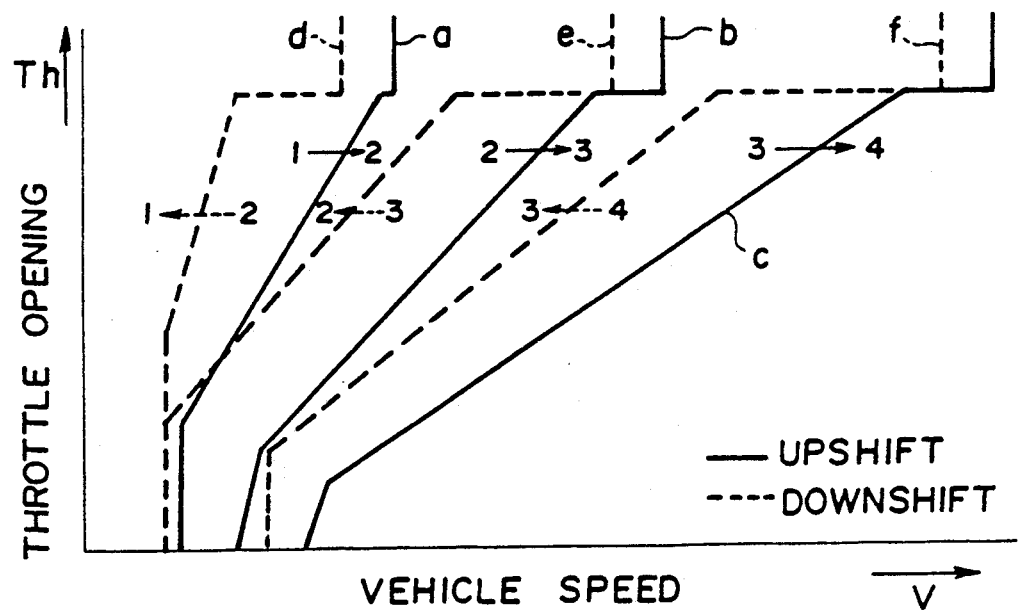
FIG. 3 shows a shift pattern map.

The transmission control unit 200 first reads the aforesaid signals, and determines whether the downshifting condition has been satisfied by referring the throttle opening Th and the vehicle speed V to the shift pattern map such as shown in FIG. 3. (Steps S1 to S3) When it is determined in step S3 that the downshifting condition has been satisfied, the transmission control unit 200 sets count C and flag F to 0. (Steps S4 and S5) Then the transmission control unit 200 performs the gear-shifting control program in step S6 and proceeds to step S7. In step S7, the transmission control unit 200 determines whether the 4-3 downshifting condition has been satisfied. When it is determined in step S7 that the 4-3 downshifting condition has been satisfied, the transmission control unit 200 sets count CC for determination of the kind of the gear-shifting to 0 in step S8 and proceeds to step S11. Otherwise the transmission control unit 200 directly proceeds to step S11. In step S11, the transmission control unit 200 increments the count C.

In the next step S12, the transmission control unit 200 determines whether the flag F has been set to 1. Since the flag F has been set to 0 at this time, the transmission control unit 200 proceeds to step S13 and determines whether either of the 3-2 downshifting condition and the 3-1 downshifting condition has been satisfied. When it has been determined in step S7 that the 4-3 downshifting condition has been satisfied, the answer to the question in step S13 is NO and accordingly, the transmission control unit 200 proceeds to step S15. In step S15, the transmission control unit 200 sets a value A which corresponds to the predetermined time Ta for the 4-3 downshift. Then the transmission control unit 200 proceeds to step S19 after setting the flag F to 1 in step S18. In step S19, it is determined whether the count C is not smaller than the value A. When it is determined in step S19 that the count C is not smaller than the value A, the transmission control unit 200 outputs the transmission-related spark retardation pulse signal Pj to the engine control unit 100 in step S20. Thereafter, the transmission control unit 200 sets the flag F and the count C to 0 in steps S21 and S22.

When it is determined in step S19 that the count C is smaller than the value A, the transmission control unit 200 returns to step S1 and repeats the steps S1, S2, S3, S9, S10, S11, S12 and S19 while incrementing the counts CC and C in steps S9 and S10 until the count C becomes not smaller than the value A.

Another downshifting condition is satisfied while the 4–3 downshifting condition has been satisfied, the answer to the question in step S3 turns to YES, and the transmission control unit 200 sets the count C and the flag F to 0 in steps S4 and S5. Then the answer to the question in step S7 turns to NO, and the transmission control unit 200 increments the count C in step S11. In this case, since the answer to the question in step S12 turns to NO, the transmission control unit 200 proceeds to step S13 and determines whether the downshifting condition which is satisfied at this time is either of the 3–2 downshifting condition or the 3–1 downshifting condition. When it is determined in step S13 that the downshifting condition which is satisfied at this time is either of the 3–2 downshifting condition or the 3–1 downshifting condition, the transmission control unit 200 proceeds to step S14 and determines whether the count CC for determination of the kind of the gear-shifting is not smaller than a value B which corresponds to said predetermined time Tb.

When it is determined in step S14 that the count CC is smaller than B, that is, when the 3–2 downshift signal or the 3–1 downshift signal is output before the count CC reaches the value B, the transmission control unit 200 considers that the downshift to be effected at this time is a jump downshift i.e., the 4–2 downshift or the 4–1 downshift, and sets the value A to a value corresponding to said predetermined time Ta for the jump downshift. (step S17) On the other hand, when it is determined in step S14 that the count CC is not smaller than B, that is, when the 3–2 downshift signal or the 3–1 downshift signal is output after the count CC reaches the value B, the transmission control unit 200 determines that the 4–3 downshift has been completed and the downshift to be effected at this time is the 3–2 downshift or the 3–1 downshift and sets the value A to a value corresponding to said predetermined time Ta for the 3–2 downshift or the 3–1 downshift.

The initial value of the count CC for determination of the kind of the gear-shifting has been set to be not smaller than said value B so that the answer to the question in step S14 is YES when the 3–2 downshift signal or the 3–1 downshift signal is output by itself.

Figures 2, 10B:
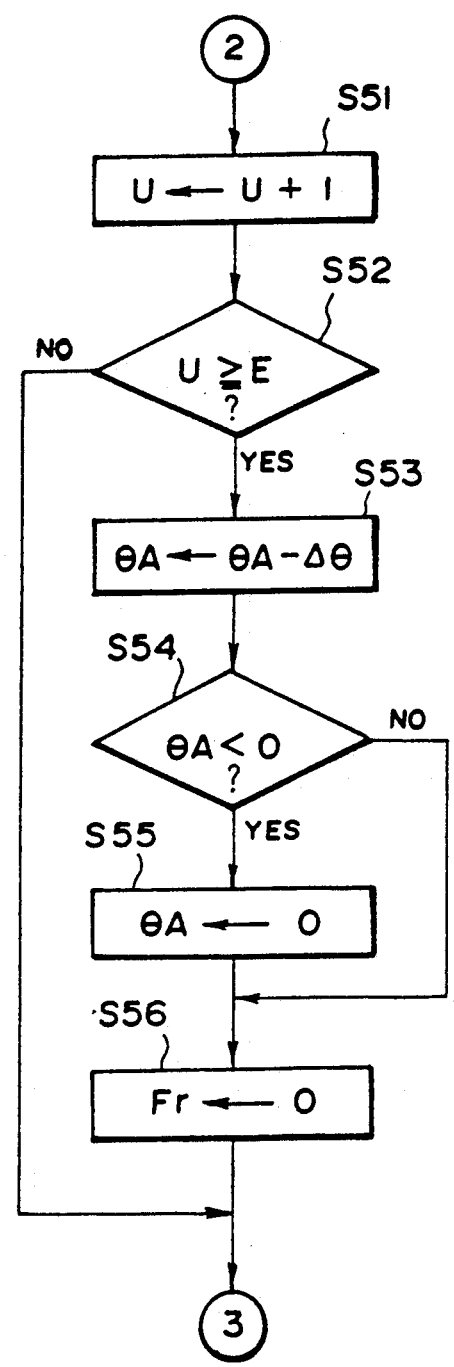

The flow chart shown in FIG. 10 is the program which the engine control unit 100 performs for the ignition timing control. The engine control unit 100 first reads the aforesaid signals in step S31 and sets the basic spark advance angle $\theta B$ according to the intake vacuum and the engine speed in step S32. In the next step S33, the engine control unit 100 determines whether the throttle opening Th is not smaller than a preset value TH1, that is, whether the engine load is not lighter than a preset load. When it is determined that the engine load is not lighter than the preset load, the engine control unit 100 proceeds to step S34 and determines whether the coolant temperature Tw is not lower than a preset temperature TW1, that is, whether the engine has been warmed up. When it is determined that the engine has been warmed up, the engine control unit 100 determines in step S35 whether the transmission-related spark retardation pulse signal Pj has been supplied thereto. When it is determined that the transmission-related spark retardation pulse signal Pj has been supplied to the engine control unit 100, the engine control unit 100 sets the transmission-related correction value $\theta A$ to the initial value $\theta a$. Then the engine control unit 100 sets a retardation flag Fr to 1 in step S38, resets a count U to 0, and then proceeds to step S41.

In step S41, the engine control unit 100 reads the knock-related correction value $\theta k$ which is set in accordance with the knock-related correction value setting program which will be described later with reference to FIG. 11. In the next step S42, the engine control unit 100 compares the transmission-related correction value $\theta A$ with the knock-related correction value $\theta k$. When it is determined that the former is larger than the latter, the engine control unit 100 sets the final correction value $\theta R$ to the transmission-related correction value $\theta A$ in step S43 and proceeds to step S45. On the other hand, when it is determined in step S42 that the latter is not smaller than the former, the engine control unit 100 sets the final correction value $\theta R$ to the knock-related correction value $\theta k$ in step S44 and proceeds to step S45.

In step S45, the engine control unit 100 subtracts the final correction value $\theta R$ from the basic spark advance angle $\theta B$ and thereby sets the effective spark advance angle $\theta$. In the next step S46, the engine control unit 100 sends an ignition timing control signal Cq to the ignition timing controller 8 at the timing corresponding to the effective spark advance angle $\theta$ on the basis of the crank angle represented by the crank angle signal Sc. Then the engine control unit 100 returns to step S31.

When it is determined in step S33 that the throttle opening Th is smaller than a preset value TH1, or when it is determined in step S34 that the coolant temperature Tw is lower than a preset temperature TW1, the engine control unit 100 sets the transmission-related correction value $\theta A$ to 0 in step S47 and resets the retardation flag Fr in step S48. Thereafter, the engine control unit 100 proceeds to step S41.

When it is determined in step S35 that the transmission-related spark retardation pulse signal Pj has not been supplied to the engine control unit 100, the engine control unit 100 proceeds to step S50 and determines whether the retardation flag Fr is 1. When it is determined that the retardation flag Fr is not 1, the engine control unit 100 proceeds to step S41 by way of steps S47 and S48. When it is determined in step S50 that the retardation flag Fr is 1, the engine control unit 100 increments the count U in step S51 and then proceeds to step S52. In step S51, the engine control unit 100 determines whether the count U is not smaller than a value corresponding to the predetermined time Tr. When it is determined that the former is smaller than the latter, the engine control unit 100 proceeds to step S42. On the other hand, when it is determined that the former is not smaller than the latter, i.e., that the predetermined time Tr has lapsed, the engine control unit 100 proceeds to step S53 and sets the transmission-related correction value $\theta A$ to the value obtained by subtracting the value $\Delta\theta$ from the current transmission-related correction value $\theta A$. Further the engine control unit 100 determines in step S54 whether the transmission-related correction value $\theta A$ thus obtained is smaller than 0. When it is determined that the former is not smaller than 0, the engine control unit 100 directly proceeds to step S56, and otherwise the engine control unit 100 proceeds to step S56 after setting the transmission-related correction value $\theta A$ to 0 in step S55. Then the engine control unit 100 resets the retardation flag Fr to 0 in step S56 and proceeds to step S42.

Figure 11:
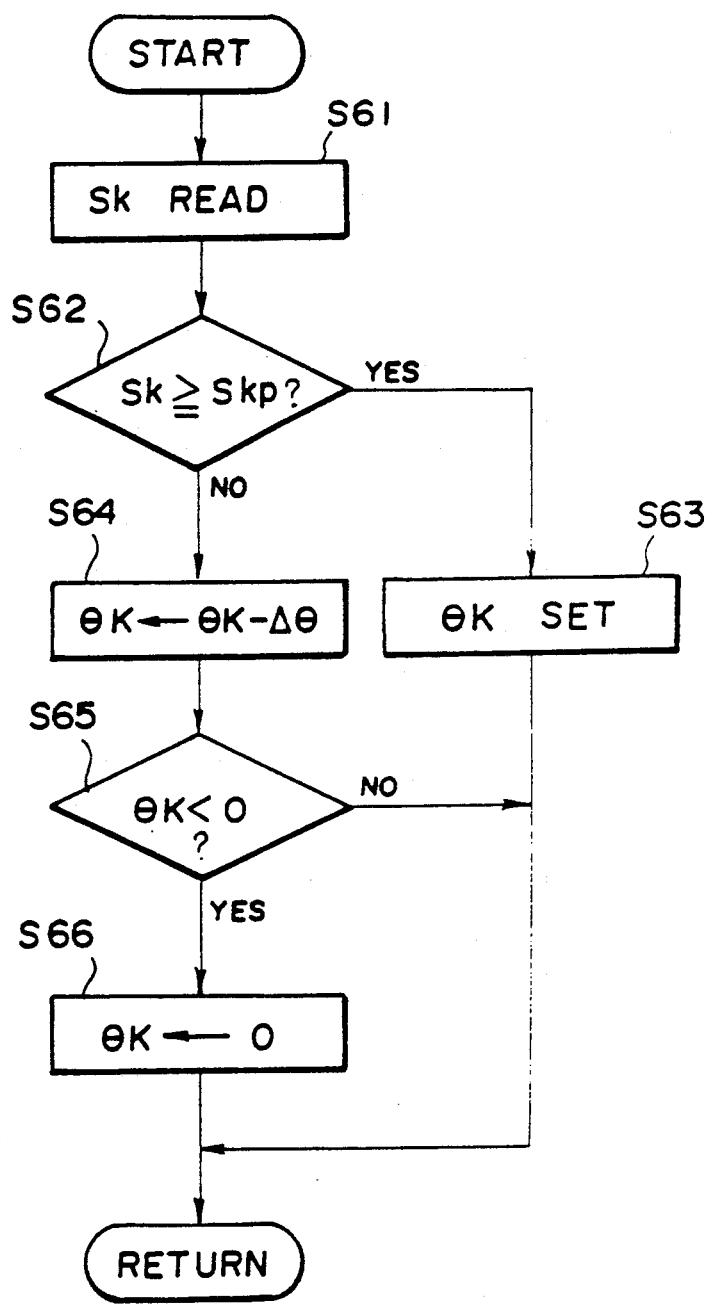

The flow chart shown in FIG. 11 is the program which the engine control unit 100 performs for setting the knock-related correction value $\theta k$. The engine control unit 100 reads the knocking signal Sk in step S61. The engine control unit 100 determines in step S62 whether the knock intensity represented by the knocking signal Sk is not smaller than a predetermined knock intensity Skp. When it is determined that the former is not smaller than the latter, the engine control unit 100 sets the knock-related correction value $\theta k$ to the value corresponding to the knock intensity in step S63 and returns. Otherwise, the engine control unit 100 sets in step S64 the knock-related correction value $\theta k$ to the value obtained by subtracting the value $\Delta\theta$ from the current knock-related correction value $\theta k$. Further the engine control unit 100 determines in step S65 whether the knock-related correction value $\theta k$ thus obtained is smaller than 0. When it is determined that the former is not smaller than 0, the engine control unit 100 directly returns, and otherwise the engine control unit 100 returns after setting the knock-related correction value $\theta k$ to 0 in step S66.

Though, in the embodiment described above, the time Ta for setting the transmission-related spark retardation signal Pj is shorter than the time Tb for determining the kind of gear-shifting, the times Ta and Tb are set according to the operational characteristics of the automatic transmission, and they may be equal to each other or the former may be longer than the latter. Further, though, in the embodiment described above, the present invention is described above about the 3-2 downshift or the 3-1 downshift after the 4-3 downshift, the present invention can also be applied to other gear-shiftings including upshifts.

Another embodiment of the present invention will be described with reference to FIGS. 12 to 19, hereinbelow. This embodiment is mechanically the same as the embodiment described above but differs from it in the control made by the transmission control unit 200 and the engine control unit 100. First the concept of the control of this embodiment will be briefly described with reference to FIGS. 18 and 19.

Figure 18:
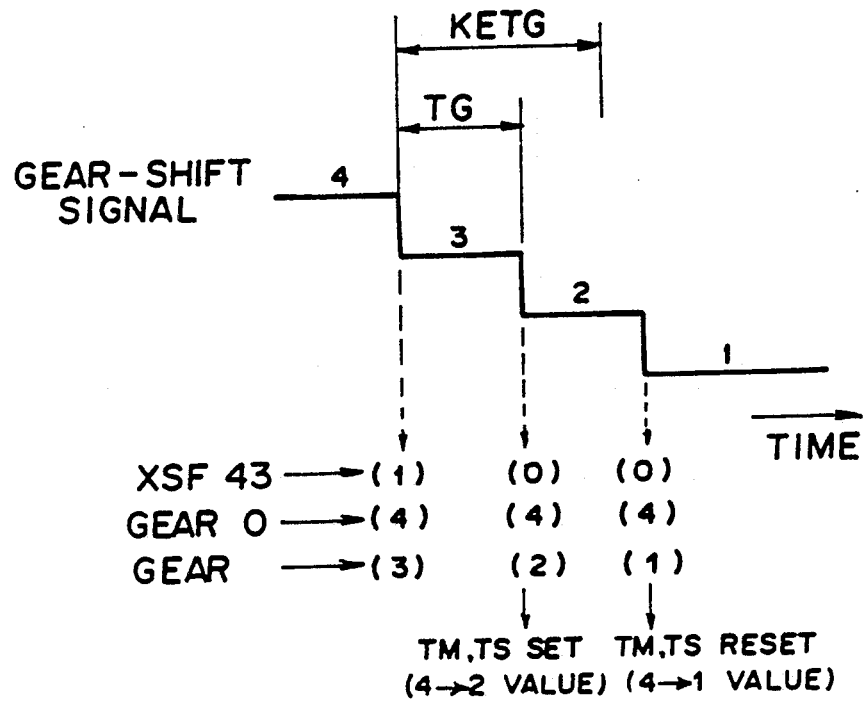

In this embodiment, timers TM and TS which govern the time at which the transmission-related spark retardation signal are set in the following manner. First a reference time KETG for determing the kind of gear-shifting is preset. When the 3-2 downshift signal is output before an elapse of the reference time KETG after the 4-3 downshift signal is output as shown in FIG. 18, the gear-speed before the gear-shifting GEARO is set for fourth and the timers TM and TS are set on the basis of the gear-speed before the gear-shifting GEARO (fourth) and the final gear-speed GEAR (second). That is, when 4-3 downshift signal and the 3-2 downshift signal are output in quick succession, it is considered that the 4-2 downshift is effected.

Figure 19:
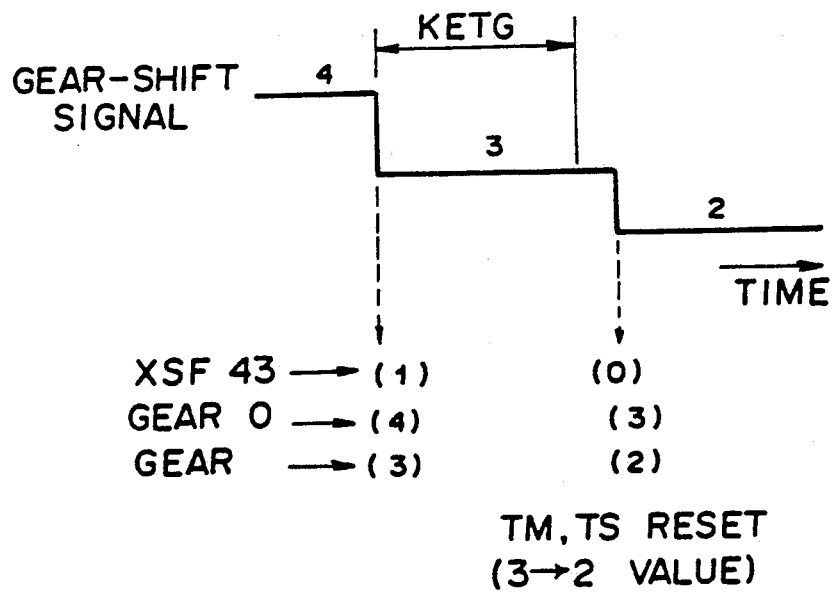

When the 2-1 downshift signal is further output after the 3-2 downshift signal before an elapse of the reference time KETG (not shown), and when the 2-1 downshift signal is further output after the 3-2 downshift signal after an elapse of the reference time KETG (FIG. 18), the gear-speed before the gear-shifting GEARO is set for fourth, and the timers TM and TS are set on the basis of the gear-speed before the gear-shifting GEARO (fourth) and the final gear-speed GEAR (first). That is, when the 3-2 downshift signal is output before an elapse of the reference time KETG after the 4-3 downshift signal is output and the 2-1 downshift signal is output after the 3-2 downshift signal is output, it is considered irrespective of when the 2-1 downshift signal On the other hand, when the 3-2 downshift signal is output after the 4-3 downshift signal is output after an elapse of the reference time KETG as shown in FIG. 19, the gear-speed before the gear-shifting GEARO is set for third, and the timers TM and TS are set on the basis of the gear-speed before the gear-shifting GEARO (third) and the final gear-speed GEAR (second).

When the gear-speed before the gear-shifting GEARO on the basis of which the timers TM and TS is set is set according to the manner of gear-shiftings, the engine output can be lowered in time to occurrence of the gear-shifting shock.

Figure 12A:
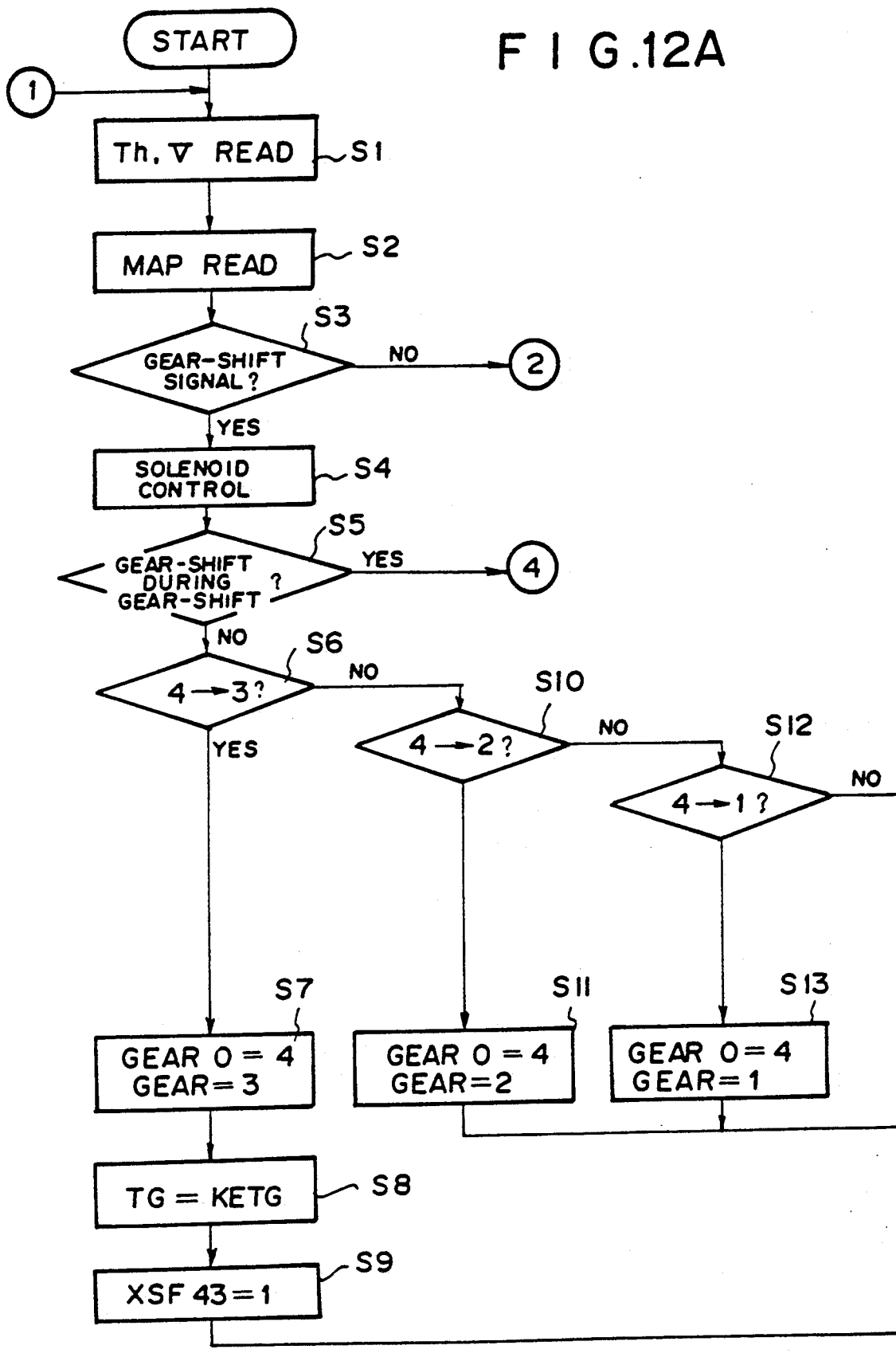
Figure 12:
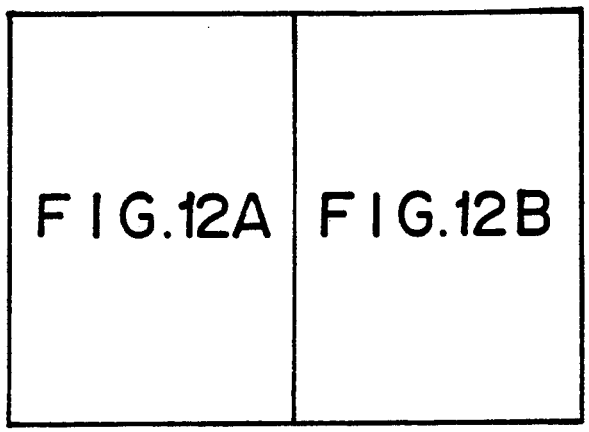
Figure 12B:
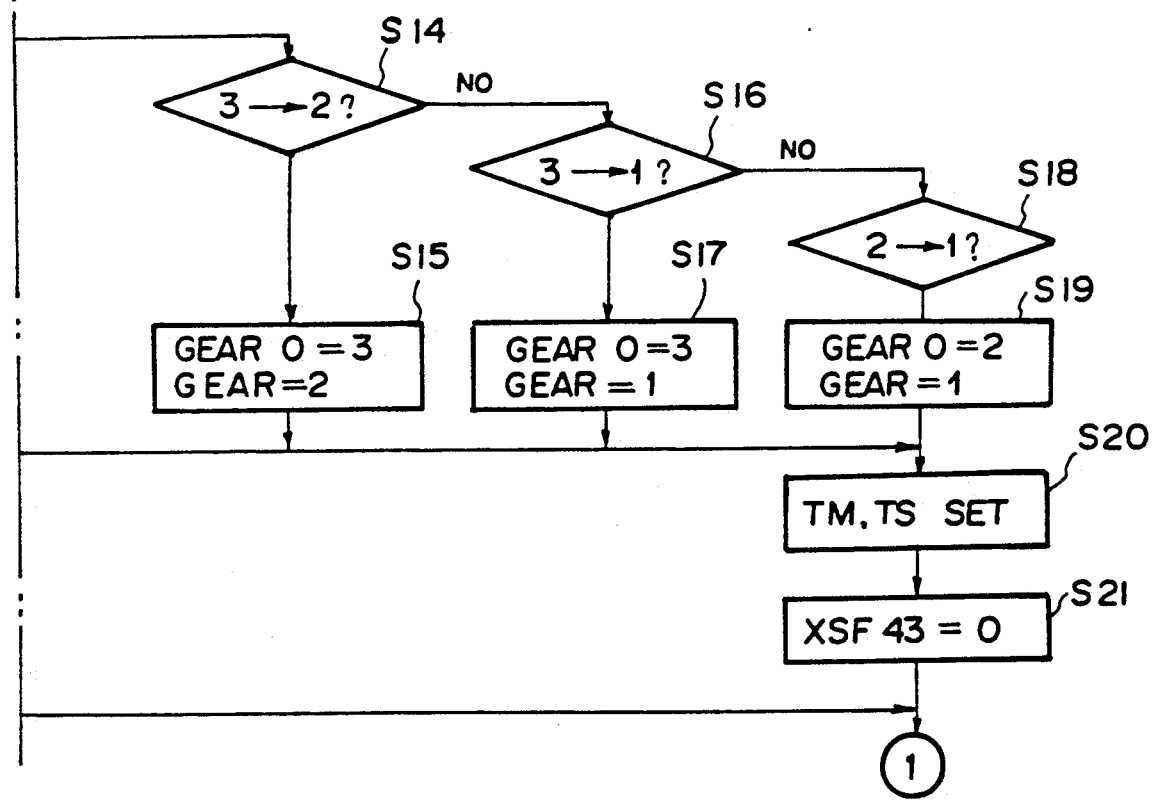

Now the operation of the transmission control unit 200 in this embodiment will be described with reference to FIGS. 12 to 14. The transmission control unit 200 reads the throttle opening Th, the vehicle speed V and the shift pattern map. (steps S1 and S2) Then the transmission control unit 200 determines in step S3 whether the gear-shifting signal (See FIG. 17) has been output. When it is determined that the gear-shifting signal has not been output, the transmission control unit 200 proceeds to step S22 (FIG. 13), and otherwise, the transmission control unit 200 controls the solenoids 61 to 65 so that the transmission gear mechanism 20 is shifted to the gear speed required by the gear-shifting signal. (step S4)

Then in step S5, the transmission control unit 200 determines whether the present gear-shifting is to be effected while the gear-shifting in accordance with the last gear-shifting signal is being effected. When the answer to this question is YES, the transmission control unit 200 proceeds to step S37 (FIG. 14), and otherwise, the transmission control unit 200 controls the engine output according to the present gear-shifting. That is, when the present gear-shifting is the 4-3 downshift, the transmission control unit 200 sets the gear-speed before the gear-shifting GEARO and the final gear-speed GEAR respectively for fourth and third. (steps S6 and S7) Then the transmission control unit 200 sets the reference time KETG to the time which has lapsed after the 4-3 downshift signal is output. (step S8) The transmission control unit 200 then sets a 4-3 downshift flag XSF43 to 1 in step S9 and returns. The flag XSF43 in 1 indicates that the 4-3 downshift is being effected.

When it is determined that the present gear-shifting is other than the 4-3 downshift, the transmission control unit 200 sets the timers TM and TS according to the kind of the gear-shifting. That is, when it is determined that the present gear-shifting is the 4-2 downshift, the transmission control unit 200 sets the gear-speed before the gear-shifting GEARO for fourth and the final gear-speed GEAR for second, and sets the times TM and TS to the value corresponding to gear-speed before gear-shifting GEARO (fourth) and the final gear-speed GEAR (second). Then the transmission control unit 200 sets the 4-3 downshift flag XSF43 to 0 and returns. (steps S10, S11, S20 and S21) When it is determined that the present gear-shifting is the 4-1 downshift, the transmission control unit 200 sets the gear-speed before the gear-shifting GEARO for fourth and the final gear-speed GEAR for first, and sets the times TM and TS to the value corresponding to gear-speed before the gear-shifting GEARO (fourth) and the final gear-speed GEAR (first). Then the transmission control unit 200 sets the 4-3 downshift flag XSF43 to 0 and returns. (steps S12, S13, S20 and S21) When it is determined that the present gear-shifting is the 3-2 downshift, the transmission control unit 200 sets the gear-speed before the gear-shifting GEARO for third and the final gear-speed GEAR for second, and sets the times TM and TS to the value corresponding to gear-speed before the gear-shifting GEARO (third) and the final gear-speed GEAR (second). Then the transmission control unit 200 sets the 4-3 downshift flag XSF43 to 0 and returns. (steps S14, S15, S20 and S21) When it is determined that the present gear-shifting is the 3-1 downshift, the transmission control unit 200 sets the gear-speed before the gear-shifting GEARO for third and the final gear-speed GEAR for first, and sets the times TM and TS to the value corresponding to gear-speed before the gear-shifting GEARO (third) and the final gear-speed GEAR (first). Then the transmission control unit 200 sets the 4-3 downshift flag XSF43 to 0 and returns. (steps S16, S17, S20 and S21) When it is determined that the present gear-shifting is the 2-1 downshift, the transmission control unit 200 sets the gear-speed before the gear-shifting GEARO for second and the final gear-speed GEAR for first, and sets the times TM and TS to the value corresponding to gear-speed before the gear-shifting GEARO (second) and the final gear-speed GEAR (first). Then the transmission control unit 200 sets the 4-3 downshift flag XSF43 to 0 and returns. (steps S18, S19, S20 and S21)

As described above, the timers TM and TS correspond to the time between the time the gear-shifting signal is output and the time the engine output control is actually started, and depend upon the gear-speed before the gear-shifting GEARO, the final gear-speed GEAR and the throttle opening Th (engine load). The timers TM and TS for various gear-speeds before the gear-shifting GEARO, final gear-speeds GEAR and the throttle openings Th have been stored in a map.

Figure 13:
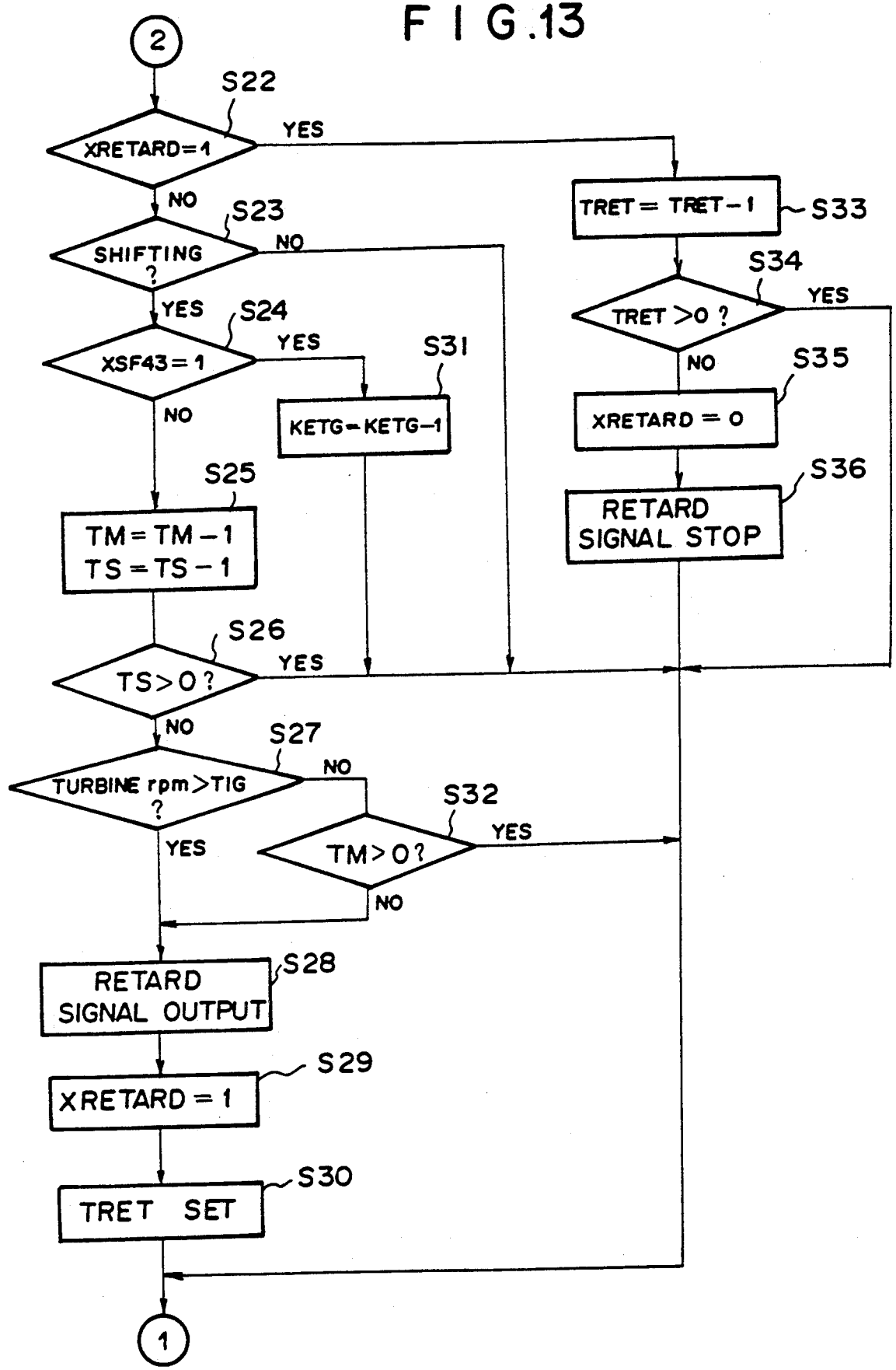
FIGS. 13 to 16 are flow charts for illustrating the operation of the transmission control unit and and the engine control unit in a gear-shifting shock suppressing system in accordance with another embodiment of the present invention.

When it is determined in step S3 that the gear-shifting signal has not been output, the transmission control unit 200 proceeds to step S22 shown in FIG. 13 and determines whether flag XRETARD has been set to 1, that is, whether the transmission-related spark retardation signal has been output. When it is determined that the flag XRETARD has been set to 0, that is, that the transmission-related spark retardation signal has not been output, the transmission control unit 200 determines in step S23 whether the gear-shifting is being effected. When it is determined that the gear-shifting is being effected, the transmission control unit 200 determines in step S24 whether the gear-shifting is 4-3 downshift. When it is determined that the gear-shifting is not 4-3 downshift, the transmission control unit 200 decrements the timers TM and TS in step S25 and proceeds to step S26. The timers TM and TS are 0 in minimum and when they are decremented to 0, they are held at 0.

When it is determined in step S23 that the gear-shiftings not being effected, the transmission control unit 200 directly returns. When it is determined in step S24 that the gear-shifting is 4-3 downshift (the flag XSF=1), the transmission control unit 200 decrements the reference time KETG (step S31) and then returns.

In step S26, the transmission control unit 200 whether the timer TS is larger than 0. When it is determined that the timer TS is larger than 0, the transmission control unit 200 directly returns. On the other hand, when it is determined that the timer TS is not larger than 0 (i.e., TS=0), the transmission control unit 200 determines is step S27 whether the turbine rpm is larger than a predetermined rpm TIG. When the turbine rpm is larger than the predetermined rpm TIG, and when the backup timer TM has been 0 though the turbine rpm is smaller than the predetermined rpm TIG, the transmission control unit 200 considers that the transmission-related spark retardation signal outputting condition has satisfied and outputs the transmission-related spark retardation signal. (steps S27, S28, S30) Then the transmission control unit 200 sets the flag XRETARD to 1 and sets a transmission-related spark retardation signal outputting time TRET.

When it is determined in step S22 that the flag XRETARD has been 1, that is, the transmission-related spark retardation signal is now being output, the transmission control unit 200 decrements the transmission-related spark retardation signal outputting time TRET in step S33 and continues to output the transmission-related spark retardation signal for the time represented by the time TRET. After an elapse of the time represented by the time TRET, the transmission control unit 200 sets the flag XRETARD to 0 and stops the output of the transmission-related spark retardation signal. (steps S34 to S36)

Figure 14:
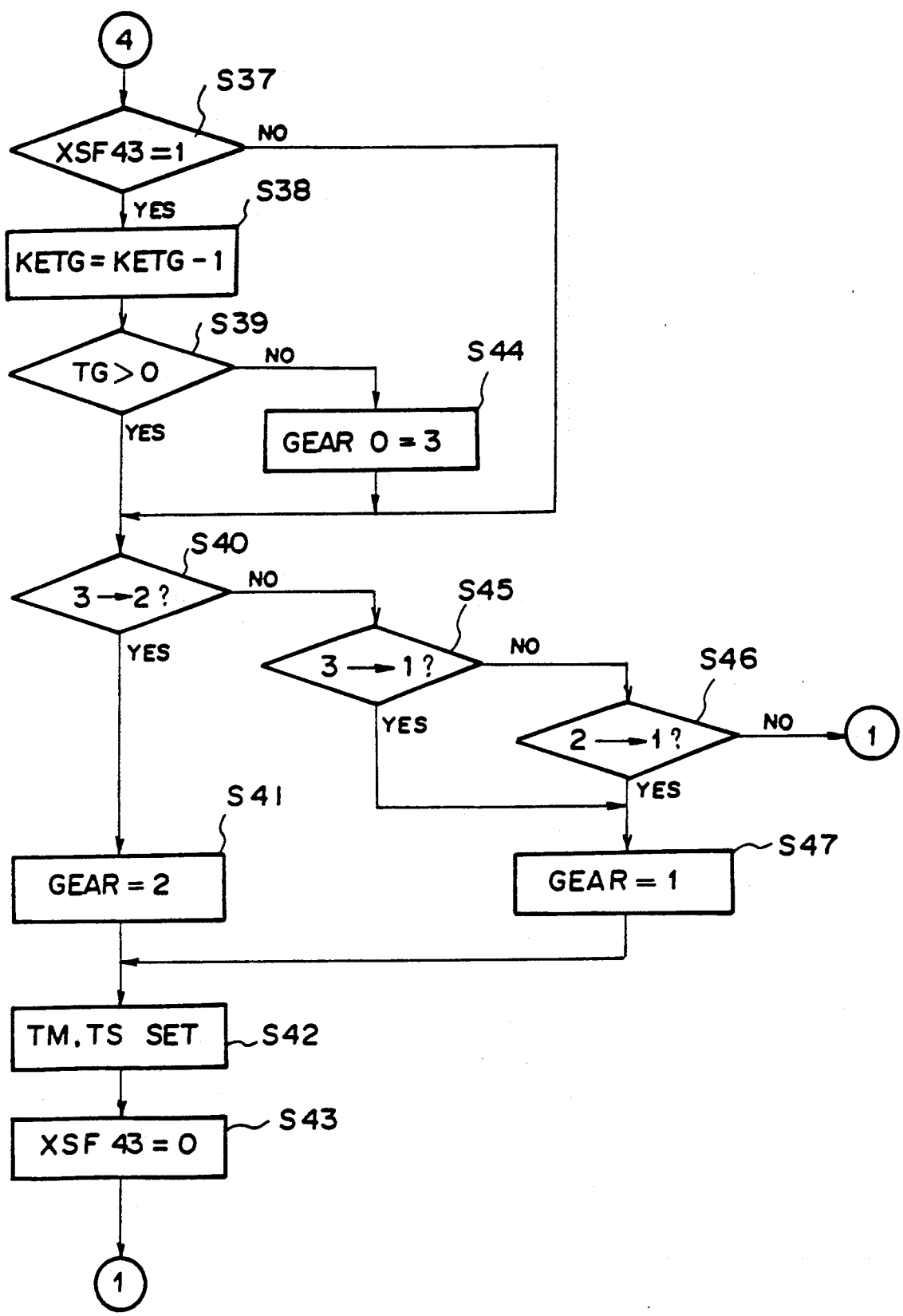

When it is determined in step S5 that the present gear-shifting is to be effected while the gear-shifting in accordance with the last gear-shifting signal is being effected, the transmission control unit 200 proceeds to step S37 shown in FIG. 14. In step S37, the transmission control unit 200 determines whether the flag XSF43 has been set to 1, that is, whether the present gear-shifting is to be effected while the 4-3 downshift is being effected. When it is determined that the flag XSF43 has been set to 1, the transmission control unit 200 decrements in step S38 the reference time KETG and determines in step S39 whether the present gear-shifting is started before the reference time KETG lapses after the 4-3 downshifting signal is output. When it is determined that the present gear-shifting is started before the reference time KETG lapses after the 4-3 downshifting signal is output, the transmission control unit 200 adopts as the gear-speed before the gear-shifting GEARO the gear-speed set in step S7 (i.e., fourth). Otherwise, the transmission control unit 200 changes the gear-speed before the gear-shifting GEARO from fourth to third in step S44.

Thereafter, the transmission control unit 200 determines the final gear-speed in steps S40, S45 and S46 and sets the final gear-speed GEAR according to the determination in steps S41 and S47.

Then the transmission control unit 200 changes the timers TM and TS (which has been set in step S20) to the value determined according to the gear-speed before the gear-shifting GEARO (fourth or third), the final gear-speed GEAR (second or first) and the throttle opening. (step S42) The transmission control unit 200 returns after resetting the XSF43 to 0.

Figure 15:
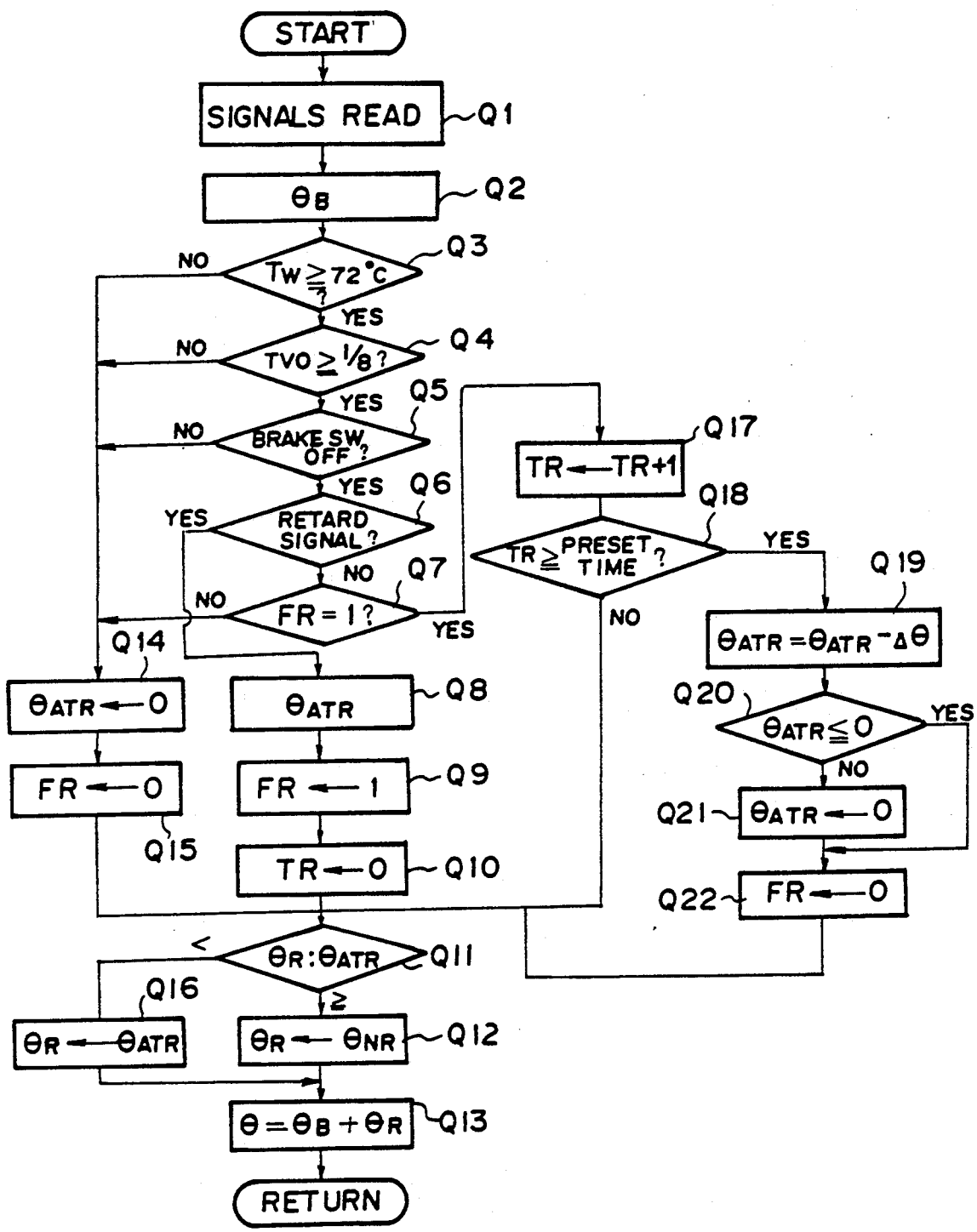

The flow chart shown in FIG. 15 is the program which the engine control unit 100 performs for the ignition timing control. The engine control unit 100 first reads the aforesaid signals in step Q1 and sets the basic spark timing $\theta B$ according to the intake vacuum and the engine speed in step Q2. In the next steps Q3 to Q7, the engine control unit 100 determines whether the coolant temperature Tw is not lower than a preset temperature (e.g., 72° C.), whether the throttle opening TVO is not smaller than ⅛, whether the brake is being applied and whether the transmission-related spark retardation signal has been supplied thereto. The signal representing whether the brake is being applied is input into the engine control unit 100 as one of said other signals Sx. When it is determined that the coolant temperature Tw is lower than 72° C., that the throttle opening TVO is smaller than ⅛, that the brake is not being applied, or that the transmission-related spark retardation signal has not been output and the transmission-related spark retardation angle has not been set (retardation flag FR is 0), the engine control unit 100 sets the transmission-related retardation angle θATR to 0 in step Q14 and resets the retardation flag Fr in step Q15. Thereafter, the engine control unit 100 proceeds to step Q11.

Since combustion in the engine deteriorates when the engine is cold, when the throttle opening is small or when the brake is applied, spark retardation in these conditions can cause misfire. Further when the ignition timing is retarded during application of the brake, the engine rpm will fall.

When it is determined in step Q6 that the transmission-related spark retardation signal has been supplied to the engine control unit 100, the engine control unit 100 sets the transmission-related retardation angle θATR in step Q8. Then the engine control unit 100 sets a retardation flag Fr to 1 in step Q9, resets a count Tr (representing the time which lapses after start of the ignition retardation control) to 0, and then proceeds to step Q11.

When it is determined in step Q7 that the retardation flag Fr is 1, the engine control unit 100 increments the count TR in step Q17 and determines in step Q18 whether the count Tr is not smaller than a value corresponding to the predetermined time Tr. When it is determined that the former is smaller than the latter, the engine control unit 100 proceeds to step Q11. On the other hand, when it is determined that the former is not smaller than the latter, i.e., that the predetermined time Tr has lapsed, the engine control unit 100 proceeds to step Q19 and sets the transmission-related retardation angle θATR to the value obtained by subtracting the value Δθ from the current transmission-related retardation angle θATR. Further the engine control unit 100 determines in step Q20 whether the transmission-related retardation angle θATR thus obtained is not larger than 0. When it is determined that the former is not larger than 0, the engine control unit 100 directly proceeds to step Q22, and otherwise the engine control unit 100 proceeds to step Q22 after setting the transmission-related retardation angle θATR to 0 in step Q21. Then the engine control unit 100 resets the retardation flag Fr to 0 in step Q22 and proceeds to step Q11.

Figure 17:
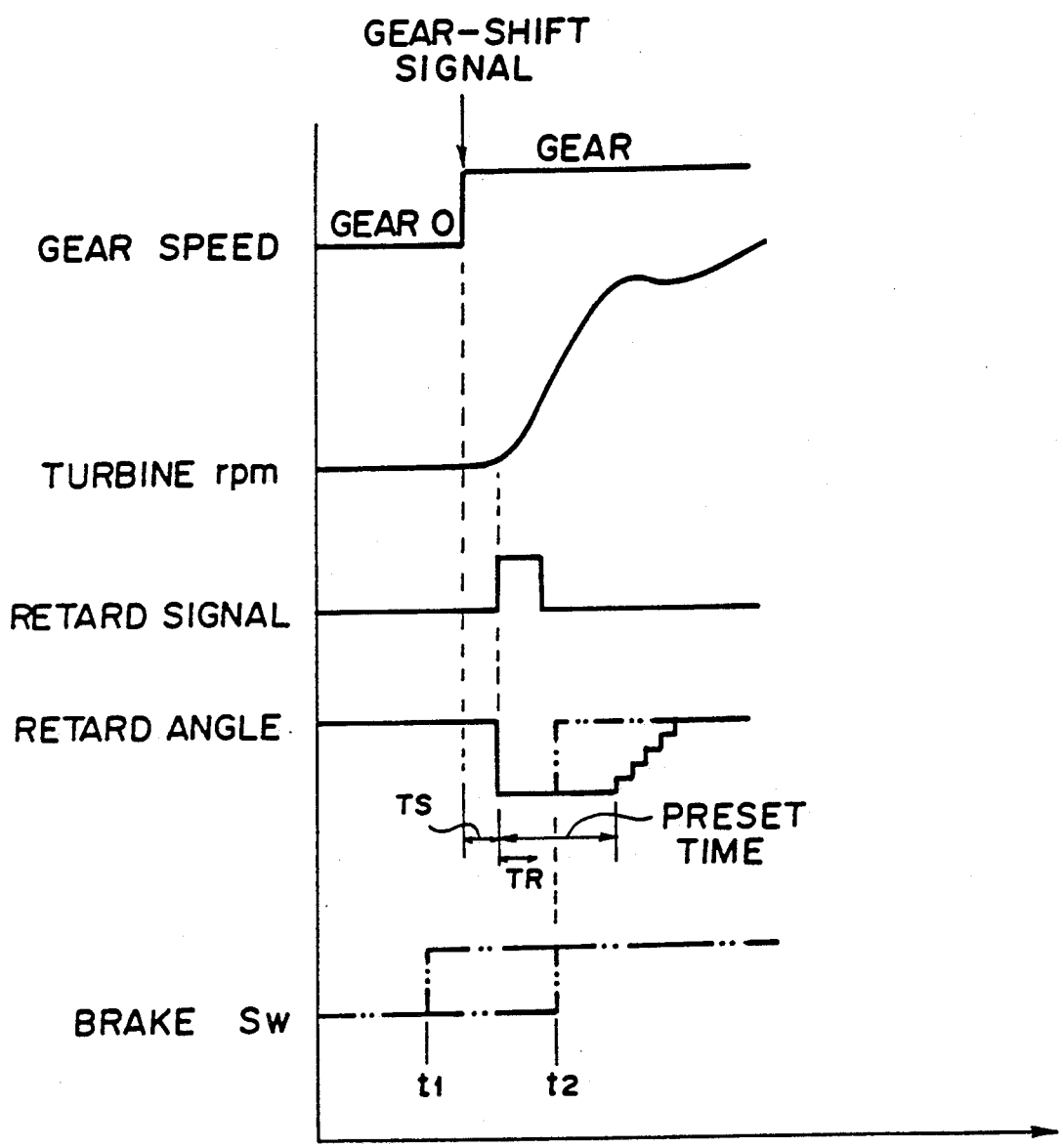
FIGS. 17-19 show the control characteristics in the second embodiment.

FIG. 17 shows the control characteristics in this embodiment. As shown in FIG. 17, when the brake is applied before output of the gear-shifting signal (at $t_1$), the ignition timing is not retarded even after the output of the signal. Further, when the brake is applied after the ignition retardation has been started (at $t_2$), the ignition retardation is stopped on the instant. (steps Q5, Q14, Q15)

After the transmission-related retardation angle ATR is thus obtained, the engine control unit 100 compares the transmission-related retardation angle θATR with the knock-related retardation angle θNR, and adopts the larger of them as the maximum retardation angle θR. (steps Q12 and Q16) Then the engine control unit 100 adds the maximum retardation angle θR to the basic ignition timing θB and determines the final ignition timing θ.

Figure 16:
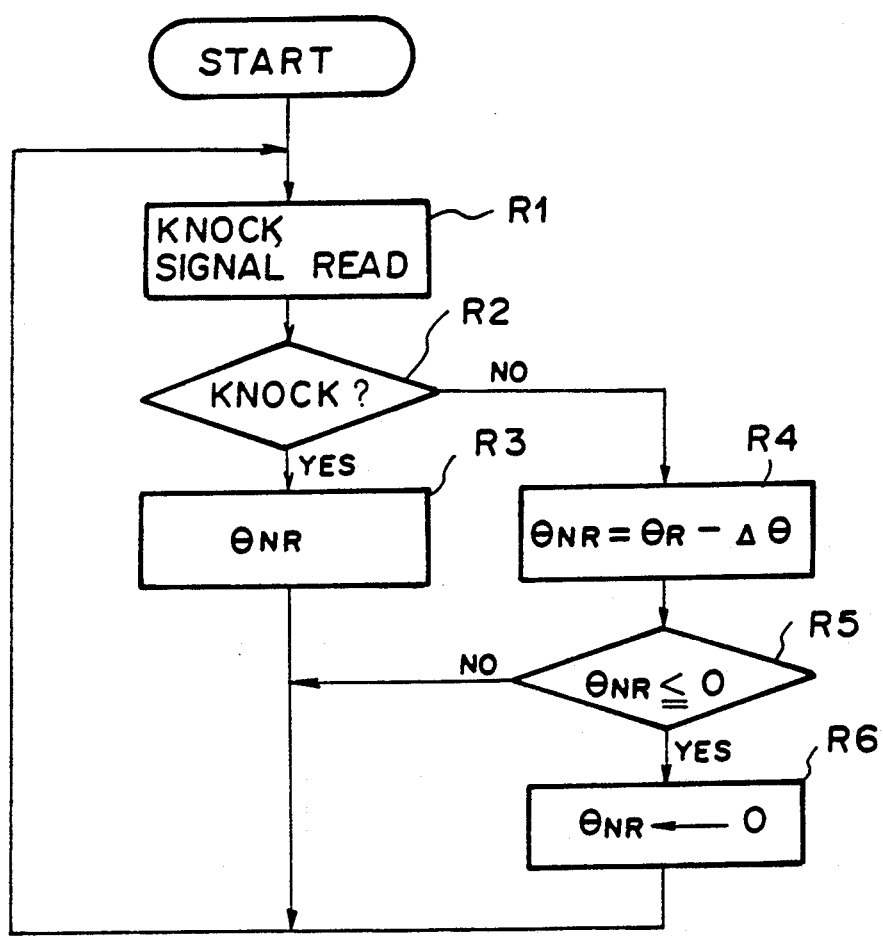

The flow chart shown in FIG. 16 is the program which the engine control unit 100 performs for setting the knock-related retardation angle θNR. The engine control unit 100 reads the knocking signal Sk in step R1. The engine control unit 100 determines in step R2 whether the knock is occurring. When it is determined that the knock is occurring, the engine control unit 100 sets the knock-related retardation angle θNR according to the knock intensity in step R3 and returns. Otherwise, the engine control unit 100 reduces the knock-related retardation angle θNR Δθ by Δθ up to 0. (steps R2 to R6)

We claim:

1. A gear-shifting shock suppressing system for a vehicle provided with an automatic transmission which shifts to a desired gear-speed on the basis of a gear-shifting signal, said gear-shifting shock suppressing system being for controlling the output of the engine of the vehicle in order to suppress gear-shifting shock which occurs when the automatic transmission shifts and characterized by having
   a determining means which detects the interval between successive two gear-shifting signals and determines whether the interval therebetween is longer or shorter than a preset time, and
   a control changing means which causes the gear-shifting shock suppressing system to control the output of the engine when the interval between successive two gear-shifting signals is longer than the preset time in a manner different from the manner in which the gear-shifting shock suppressing system controls the output of the engine when the interval between successive two gear-shifting signals is shorter than the preset time.

2. A gear-shifting shock suppressing system as defined in claim 1 in which said control changing means comprises a control signal outputting means which outputs a control signal for reducing the output of the engine a predetermined time after the gear-shifting signal is output, and a changing means which changes the control signal according to the result of determination of the determining means.

3. A gear-shifting shock suppressing system as defined in claim 2 in which said control signal is a spark retardation signal which retards the ignition timing of the engine.

4. A gear-shifting shock suppressing system as defined in claim 3 in which said spark retardation signal is output a first predetermined time after the gear-shifting signal is output, retards the ignition timing by a predetermined crank angle for a second predetermined time, and retards the ignition timing by a gradually decreasing crank angle after an elapse of the second predetermined time after the spark retardation signal is output.

5. A gear-shifting shock suppressing system as defined in claim 4 in which at least one of the first and second predetermined times and the predetermined crank angle has been determined according to the kind of gear-shifting shifting and the engine load at the time the gear-shifting is effected.

6. A gear-shifting shock suppressing system as defined in claim 5 in which said engine load is detected through the throttle opening.

7. A gear-shifting shock suppressing system as defined in claim 4 in which at least one of the first and second predetermined times and the predetermined crank angle has been determined according to the kind of gear-shifting.

8. A gear-shifting shock suppressing system as defined in claim 7 in which said changing means sets the first and second predetermined times and the predetermined crank angle so that at least one of them changes according to the kind of the gear-shifting designated by the gear-shifting signal when the interval between a certain gear-shifting signal and the last gear-shifting signal is longer than the preset time, and so that at least one of them changes according to the gear-speed before the last gear-shifting signal is output and the gear-speed to which the transmission is shifted by the certain gear-shifting signal when the interval between the certain gear-shifting signal and the last gear-shifting signal is shorter than the preset time.

9. A gear-shifting shock suppressing system for a vehicle which is provided with an automatic transmission, a transmission control means which outputs a gear-shifting signal for shifting the automatic transmission to a gear speed determined according to the running condition of the vehicle, an engine output control means which controls the output of the vehicle and a control signal output means which outputs a control signal to the engine output control means which causes the engine output control means to lower the output of the engine a predetermined time after the gear-shifting signal is output from the transmission control means, characterized in that
said control signal output means comprises
a first control signal output means which outputs the control signal which causes the engine output control means to lower the output of the engine on the basis of a first predetermined time which is determined according to the kind of the gear-shifting designated by the gear-shifting signal, and
a second control signal output means which outputs the control signal when a plurality of the gear-shifting signals are output at intervals shorter than a third predetermined time and outputs the control signal which causes the engine output control means to lower the output of the engine on the basis of a second predetermined time which is determined according to the gear-speed before the first gear-shifting signal is output and the gear-speed to which the transmission is shifted by the last gear-shifting signal.

10. A gear-shifting shock suppressing system as defined in claim 8 in which said first control signal output means outputs the control signal said first predetermined time after the gear-shifting signal is output, and said second control signal output means outputs the control signal said second predetermined time after the least gear-shifting signal is output.

11. A gear-shifting shock suppressing system for a vehicle provided with an automatic transmission which shifts to a desired gear-speed on the basis of a gear-shifting signal, said gear-shifting shock suppressing system being for controlling the output of the engine of the vehicle in order to suppress gear-shifting shock which occurs when the automatic transmission shifts and characterized by having
control means for controlling the output of the engine in response to a gear-shifting signal which commands a gear-shifting in order to suppress the gear-shifting shock, and
inhibiting means which inhibits the control means from controlling the output of the engine when the gear-shifting signal is output under a predetermined condition, wherein said inhibiting means inhibits the control means from controlling the output of the engine when a plurality of the gear-shifting signals are output at short intervals.

12. A gear-shifting shock suppressing system as defined in claim 10 in which, when a plurality of the gear-shifting signals are output at short intervals, said inhibiting means controls the engine output according to the gear-speed before the first gear-shifting signal is output and the gear-speed to which the transmission is shifted by the last gear-shifting signal.

* * * * *